United States Patent
Wu et al.

(10) Patent No.: US 11,706,324 B2
(45) Date of Patent: Jul. 18, 2023

(54) HYBRID NETWORK COMMUNICATION METHOD, DEVICE, AND SYSTEM

(71) Applicant: HUAWEI TECHNOLOGIES CO., LTD., Guangdong (CN)

(72) Inventors: Yuefeng Wu, Nanjing (CN); Jiajie Tan, Dongguan (CN); Qi Yu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/709,194

(22) Filed: Mar. 30, 2022

(65) Prior Publication Data

US 2022/0224782 A1    Jul. 14, 2022

Related U.S. Application Data

(63) Continuation of application No. PCT/CN2020/117460, filed on Sep. 24, 2020.

(30) Foreign Application Priority Data

Sep. 30, 2019    (CN) .......................... 201910945133.9

(51) Int. Cl.
*H04L 69/323* (2022.01)
*H04L 61/5046* (2022.01)
(Continued)

(52) U.S. Cl.
CPC ............ *H04L 69/323* (2013.01); *H04L 43/10* (2013.01); *H04L 61/2503* (2013.01);
(Continued)

(58) Field of Classification Search
None
See application file for complete search history.

(56) References Cited

U.S. PATENT DOCUMENTS

2008/0192681 A1* 8/2008 Lee ...................... H04W 48/18
370/328
2012/0177057 A1   7/2012 Hemli et al.
(Continued)

FOREIGN PATENT DOCUMENTS

CA        3094555 A1    9/2019
CN      104885416 A     9/2015
(Continued)

OTHER PUBLICATIONS

Alfredo Sanz,"Evolution of Prime to PLC-RF hybrid systems",2019 1st Global Power, Energy and Communication Conference (IEEE GPECOM2019), Jun. 12-15, 2019, Cappadocia, Turkey, total 6 pages.
(Continued)

*Primary Examiner* — Angela Nguyen
(74) *Attorney, Agent, or Firm* — Gregg L. Jansen

(57) ABSTRACT

A hybrid network communication method is disclosed. A gateway device receives a first association request of a multimode device through a first physical interface, where the first association request includes a MAC address of a second physical interface of the multimode device. The gateway device receives a second association request of the multimode device through a third physical interface, where the second association request includes a MAC address of a fourth physical interface of the multimode device. The gateway device obtains an IPv6 address of the multimode device, and records a first correspondence and a second correspondence. The first correspondence includes the IPv6 address of the multimode device, the MAC address of the second physical interface, and the first physical interface. The second correspondence includes the IPv6 address of the multimode device, the MAC address of the fourth physical interface, and the third physical interface.

20 Claims, 8 Drawing Sheets

(51) Int. Cl.
*H04L 61/50* (2022.01)
*H04L 43/10* (2022.01)
*H04L 61/2503* (2022.01)
*H04L 101/659* (2022.01)

(52) U.S. Cl.
CPC .......... *H04L 61/50* (2022.05); *H04L 61/5046* (2022.05); *H04L 2101/659* (2022.05)

(56) References Cited

U.S. PATENT DOCUMENTS

| 2013/0136117 | A1 | 5/2013 | Schrum, Jr. et al. | |
|---|---|---|---|---|
| 2016/0150454 | A1* | 5/2016 | Kephart, Jr. .......... | H04W 36/18 455/442 |
| 2021/0234834 | A1* | 7/2021 | Koshy ................... | H04L 69/14 |

FOREIGN PATENT DOCUMENTS

| CN | 107580079 | A | 1/2018 |
|---|---|---|---|
| CN | 108769943 | A | 11/2018 |
| CN | 110191029 | A | 8/2019 |
| EP | 2099171 | A1 | 9/2009 |
| EP | 2490469 | A1 | 8/2012 |
| WO | 2017166190 | A1 | 10/2017 |
| WO | 2019179444 | A1 | 9/2019 |

OTHER PUBLICATIONS

F. Gont,"A Method for Generating Semantically Opaque Interface Identifiers with IPv6 Stateless Address Autoconfiguration (SLAAC)",Internet Engineering Task Force (IETF); Request for Comments: 7217, Apr. 2014, total 20 pages.

IEEE Std 1901.1-2018, IEEE Standard for Medium Frequency (less than 12 MHz)Power Line Communications for Smart Grid Applications; IEEE Communications Society, Sponsored by the Power Line Communication Standards Committee, Total 192 Pages.

M. Crawford,"Transmission of IPv6 Packets over Ethernet Networks",Network Working Group; Request for Comments: 2464, Dec. 1998, total 7 pages.

State Grid Enterprise Standard,"Power user electric energy data acquisition system communication protocol Part 4: Micro-Power Wireless Data Transmission Protocol",Sep. 10, 2013, with a partial machine translation, total 136 pages.

State Grid Corporation Enterprise Standard,"Low voltage power line broadband communication technical specifation part1: general", Jun. 2017, with a partial machine translation, total 17 pages.

* cited by examiner

HYBRID NETWORK COMMUNICATION METHOD, DEVICE, AND SYSTEM

CROSS-REFERENCE TO RELATED APPLICATIONS

This application is a continuation of International Application No. PCT/CN2020/117460, filed on Sep. 24, 2020, which claims priority to Chinese Patent Application No. 201910945133.9, filed on Sep. 30, 2019. The disclosures of the aforementioned applications are hereby incorporated by reference in their entireties.

TECHNICAL FIELD

This application relates to the communication field, and in particular, to a hybrid network communication method, a device, and a system.

BACKGROUND

A power line communication (PLC) technology is a carrier communication mode in which information is transmitted over electrical power cables as a medium. The PLC technology is applied based on existing grid infrastructure, and can be used in places in which electrical power cables are available. Therefore, there is no need to lay out additional cables, and deployment costs are low. A PLC network has a wide range of communication frequencies. Currently, there are already a plurality of PLC technology standards in the world. The Institute of Electrical and Electronics Engineers (IEEE) standard 1901 is a standard for frequency bands from 2 MHz to 12 MHz, and can provide bidirectional, real-time, high-speed, and secure communication channels, to enable public utilities and home users to easily communicate with each other, so as to monitor and control powered devices such as meters and street lights. The PLC network has been widely deployed in smart grids, smart home networks, and other fields.

Frequencies of radio frequency (RF) range from 3 kilohertz (KHz) to 300 gigahertz (GHz). A micro-power wireless coverage area is generally about 100 meters. Therefore, a plurality of relays are required to construct a mesh network to enlarge the coverage area. An RF mesh network, also referred to as a low-speed radio frequency mesh (RF mesh) network, is usually constructed by using the Internet Protocol version 6 (IPv6), an IPv6 over low wireless personal area network (6LoWPAN), and IEEE 802.15.4-defined physical layer and data link layer specifications as a technical framework in the industry. The RF mesh network is also a common IoT technology, and is widely used in the fields of smart grids, smart home networks, and the like.

The PLC network has high bandwidth and is not constrained by physical obstacles. The PLC network can implement communication in scenarios such as wall-penetration, underground, and tunnels. However, a technical obstacle that the PLC network does not support communication across transformers still exists. The RF network is flexible in device deployment, but wireless signal strength is constrained by physical obstacles. Especially in underground and tunnel, communication quality deteriorates sharply. Hybrid networking of PLC and RF technologies can make up for disadvantages and highlight advantages of each other. However, the PLC technology and the RF technology differ greatly at physical layers and link layers. This makes it difficult to implement PLC-RF hybrid networking and there are many problems.

SUMMARY

This application provides a hybrid networking implementation method, an apparatus, and a system, so that an application layer does not need to sense and select a network, and can access a device based on an IP address. In this way, PLC-RF hybrid networking can still be implemented even though PLC and RF differ greatly in link layer protocols, networking algorithms, and rates.

According to a first aspect, a hybrid network communication method is provided. The method includes:

a gateway device receives a first association request of a first multimode device through a first physical interface, where the first association request includes a MAC address of a second physical interface, the first multimode device supports a first communication protocol and a second communication protocol, the first physical interface is a physical interface of the gateway device, the second physical interface is a physical interface of the first multimode device, and a protocol type used by the first physical interface and the second physical interface is the first communication protocol;

the gateway device receives a second association request of the first multimode device through a third physical interface, where the second association request includes a MAC address of a fourth physical interface, the third physical interface is a physical interface of the gateway device, the fourth physical interface is a physical interface of the first multimode device, and a protocol type used by the third physical interface and the fourth physical interface is the second communication protocol;

the gateway device obtains an Internet Protocol version 6 IPv6 address of the first multimode device; and the gateway device records a first correspondence and a second correspondence, where the first correspondence includes a correspondence among the IPv6 address of the first multimode device, the MAC address of the second physical interface, and the first physical interface, and the second correspondence includes a correspondence among the IPv6 address of the first multimode device, the MAC address of the fourth physical interface, and the third physical interface.

Further, the method further includes:

the gateway device receives a first packet whose destination IP address is the IPv6 address of the first multimode device; and the gateway device sets a destination MAC address of the first packet to the MAC address of the second physical interface based on the first correspondence, to obtain a second packet, and sends the second packet through the first physical interface; or the gateway device sets a destination MAC address of the first packet to the MAC address of the fourth physical interface based on the second correspondence, to obtain a third packet, and sends the third packet through the third physical interface.

In an embodiment of the first aspect, the gateway device further sends a first notification to the first multimode device through the first physical interface, where the first notification includes a MAC address of the first physical interface, so that the first multimode device records a first uplink correspondence, where the first uplink correspondence includes a correspondence among a default IP address, the first physical interface, and the second physical interface. Further, the gateway device may receive a fourth packet through the first physical interface, where a destination MAC address of the fourth packet is the MAC address of the first physical interface, a source MAC address of the fourth packet is the MAC address of the second physical interface, and a destination IP address of the fourth packet is a source IP address of the first packet.

In an embodiment of the first aspect, the gateway device sends a second notification to the first multimode device through the third physical interface, where the second notification includes a MAC address of the third physical interface, so that the first multimode device records a second uplink correspondence, where the second uplink correspondence includes a correspondence among the default IP address, the third physical interface, and the fourth physical interface. Further, the gateway device may receive a fifth packet through the third physical interface, where a destination MAC address of the fifth packet is the MAC address of the third physical interface, a source MAC address of the fifth packet is the MAC address of the fourth physical interface, and a destination IP address of the fifth packet is the source IP address of the first packet.

In an embodiment of the first aspect, the gateway device receives an address advertisement message sent by the first multimode device, where the address advertisement message includes the MAC address of the second physical interface, the MAC address of the fourth physical interface, and the IPv6 address of the first multimode device, so that the gateway device obtains the IPv6 address of the first multimode device.

Further, before the gateway device receives the address advertisement message sent by the first multimode device, the gateway device may send a configuration message to the first multimode device, where the configuration message includes an IPv6 address prefix, and the IPv6 address in the address advertisement message includes the IPv6 address prefix.

In an embodiment of the first aspect, the hybrid network further needs to perform link layer encryption, and the configuration message further includes a link-layer key. The gateway device may perform network access authentication on the first multimode device, negotiate with the first multimode device to generate a master key, and encrypt the configuration message by using the master key.

In an embodiment of the first aspect, the gateway device broadcasts a first heartbeat message through the first physical interface, where a source MAC address of the first heartbeat message is the MAC address of the first physical interface, a destination MAC address of the first heartbeat message is a MAC broadcast address, a destination IPv6 address of the first heartbeat message is an IPv6 broadcast address, and a payload of the first heartbeat message carries the MAC address of the first physical interface. The gateway device broadcasts a second heartbeat message through the third physical interface, where a source MAC address of the second heartbeat message is the MAC address of the third physical interface, a destination MAC address of the second heartbeat message is a MAC broadcast address, a destination IPv6 address of the second heartbeat message is an IPv6 broadcast address, and a payload of the second heartbeat message carries the MAC address of the third physical interface.

According to a second aspect, a hybrid network communication method is provided. The method includes:

a multimode device receives a first notification from a gateway device through a first physical interface, where the first notification includes a MAC address of a second physical interface, the first physical interface is a physical interface of the multimode device, the second physical interface is a physical interface of the gateway device, the multimode device supports a first communication protocol and a second communication protocol, and a protocol type used by the first physical interface and the second physical interface is the first communication protocol;

the multimode device receives a second notification from the gateway device through a third physical interface, where the second notification includes a MAC address of a fourth physical interface, the third physical interface is a physical interface of the multimode device, the fourth physical interface is a physical interface of the gateway device, and a protocol type used by the third physical interface and the fourth physical interface is the second communication protocol;

the multimode device records a first default gateway correspondence and a second default gateway correspondence, where the first default gateway correspondence includes a correspondence among a default IP address, the MAC address of the second physical interface, and the first physical interface; and the second default gateway correspondence includes a correspondence among the default IP address, the MAC address of the fourth physical interface, and the third physical interface; and when sending a first packet, the multimode device sets a destination MAC address of the first packet to the MAC address of the second physical interface based on the first default gateway correspondence, to obtain a second packet, and sends the second packet through the first physical interface; or the multimode device sets a destination MAC address of the first packet to the MAC address of the fourth physical interface based on the second default gateway correspondence, to obtain a third packet, and sends the third packet through the third physical interface.

In an embodiment of the second aspect, the multimode device sends a first association request through the first physical interface, where the first association request includes a MAC address of the first physical interface; and the multimode device sends a second association request through the third physical interface, where the second association request includes a MAC address of the third physical interface.

In an embodiment of the second aspect, the multimode device sends an address advertisement message to the gateway device, where the address advertisement message includes the MAC address of the first physical interface, the MAC address of the third physical interface, and an IPv6 address of the multimode device, so that the gateway device obtains the IPv6 address of the multimode device, and establishes the first correspondence and the second correspondence as described in the first aspect.

In an embodiment of the second aspect, before sending the address advertisement message to the gateway device, the multimode device receives a configuration message sent by the gateway device, where the configuration message includes an IPv6 address prefix, and the IPv6 address in the address advertisement message includes the IPv6 address prefix.

In an embodiment of the second aspect, the multimode device processes a fourth packet if the first physical interface of the multimode device receives the fourth packet, where a destination IP address of the fourth packet is the IPv6 address of the multimode device, and a destination MAC address of the fourth packet is the MAC address of the first physical interface; and the multimode device processes a fifth packet if the third physical interface of the multimode device receives the fifth packet, where a destination IP address of the fifth packet is the IPv6 address of the multimode device, and a destination MAC address of the fifth packet is the MAC address of the third physical interface.

In an embodiment of the second aspect, the gateway device performs network access authentication on the multimode device, and negotiates with the multimode device to generate a master key. The method includes:

the multimode device sends, to the gateway device, a first client hello packet carrying no cookie;

the multimode device receives a hello verification request packet sent by the gateway device, where the hello verification request packet includes a first cookie generated by the gateway device;

the multimode device sends, to the gateway device, a second client hello packet carrying the first cookie, where the second client hello packet includes a 32-byte random number, a session identifier, and a cipher suite and a signature algorithm that are supported by the multimode device;

the multimode device receives a first certificate packet sent by the gateway device, where the first certificate packet includes an elliptic curve digital signature algorithm ECDSA-signed first elliptic curve cryptography ECC certificate of the gateway device;

the multimode device verifies a signature and validity of the first ECC certificate by using a static public key in the first ECC certificate in the multimode device, and sends a second certificate packet to the gateway device, where the second certificate packet includes the ECDSA-signed first ECC certificate;

the multimode device receives an ECDSA-signed first server key exchange packet sent by the gateway device, where the first server key exchange packet includes several temporary elliptic curve Diffie-Hellman ECDH public keys and corresponding elliptic curve domain parameters;

the multimode device verifies a signature of the first server key exchange packet by using the static public key in the first ECC certificate, selects a temporary ECDH public key and a corresponding elliptic curve domain parameter from the first server key exchange packet, and sends a client key exchange packet to the gateway device;

the multimode device receives a first certificate request packet sent by the gateway device, and performs, by using a private key of the multimode device, an ECDSA digital signature on the second client hello packet, the second certificate packet, and the client key exchange packet;

the multimode device sends a certificate authentication packet to the gateway device, where the certificate authentication packet includes an ECDSA-signed second ECC certificate of the multimode device, so that the gateway device verifies a signature and validity of the second ECC certificate, and a signature of the certificate authentication packet;

the multimode device generates a pre-master key by using the private key of the multimode device and a temporary ECDH public key of the gateway device, and calculates a 48-byte master key based on the 32-byte random number in the second client hello packet; and the multimode device sends a change cipher specification packet to the gateway device, indicating that packets subsequently sent by the multimode device are encrypted by using the master key.

In an embodiment of the second aspect, the configuration message is encrypted by using the master key obtained through negotiation. The configuration message further includes a link-layer key.

In an embodiment of the second aspect, the multimode device sends a first heartbeat message, where a source MAC address of the first heartbeat message is the MAC address of the first physical interface, a destination MAC address of the first heartbeat message is the MAC address of the second physical interface, and a payload of the first heartbeat message carries the MAC address of the first physical interface; and the multimode device sends a second heartbeat message, where a source MAC address of the second heartbeat message is the MAC address of the third physical interface, a destination MAC address of the second heartbeat message is the MAC address of the fourth physical interface, and a payload of the second heartbeat message carries the MAC address of the third physical interface; and the gateway device may refresh the first correspondence and the second correspondence between the gateway device and the multimode device by receiving the first heartbeat message and the second heartbeat message.

According to a third aspect, a gateway device is provided, including a plurality of functional modules. The plurality of functional modules interact with each other to implement the method in the first aspect and the embodiments of the first aspect. The plurality of functional modules may be implemented based on software, hardware, or a combination of software and hardware, and the plurality of functional modules may be randomly combined or divided based on the implementation.

According to a fourth aspect, a network device is provided. The network device supports a first communication protocol and a second communication protocol. The network device includes a plurality of functional modules, where the plurality of functional modules interact with each other to implement the method in the second aspect and the embodiments of the second aspect. The plurality of functional modules may be implemented based on software, hardware, or a combination of software and hardware, and the plurality of functional modules may be randomly combined or divided based on the implementation.

According to a fifth aspect, a gateway device is provided. The gateway device includes a first physical interface, a second physical interface, a processor, and a memory. The processor is connected to both the first physical interface and the second physical interface. The first physical interface uses a first communication protocol, for example, a PLC protocol. The second physical interface uses a second communication protocol, for example, an RF protocol.

The memory is configured to store a computer program, where the computer program includes program instructions.

The processor is configured to invoke the computer program to implement the hybrid network communication method according to any one of the first aspect or the embodiments of the first aspect.

According to a sixth aspect, a network device is provided. The network device includes a first physical interface, a second physical interface, a processor, and a memory. The processor is connected to both the first physical interface and the second physical interface. The first physical interface uses a first communication protocol, for example, a PLC protocol. The second physical interface uses a second communication protocol, for example, an RF protocol.

The memory is configured to store instructions, and the processor executes the instructions stored in the memory, to implement the hybrid network communication method according to any one of the second aspect or the embodiments of the second aspect.

According to a seventh aspect, this application provides a computer-readable storage medium. The computer-readable storage medium stores instructions. When the instructions are run on a computer, the computer is enabled to perform the method according to any one of the first aspect or the embodiments of the first aspect.

According to an eighth aspect, this application provides a computer program product including instructions. When the instructions in the computer program product are run on a computer, the computer performs the method according to any one of the first aspect or the embodiments of the first aspect.

According to a ninth aspect, this application provides a computer-readable storage medium. The computer-readable storage medium stores instructions. When the instructions are run on a computer, the computer is enabled to perform the method according to any one of the second aspect or the embodiments of the second aspect.

According to a tenth aspect, this application provides a computer program product including instructions. When the instructions in the computer program product are run on a computer, the computer performs the method according to any one of the second aspect or the embodiments of the second aspect.

Beneficial effects that can be achieved by the foregoing aspects and the embodiments of the foregoing aspects correspond to beneficial effects that can be achieved by the first aspect and the embodiments of the first aspect. Details are not described herein again.

DESCRIPTION OF EMBODIMENTS

The following describes the technical solutions of this application with reference to the accompanying drawings.

This application provides a hybrid network communication method, to establish a hybrid network for a network device (referred to as a multimode device hereinafter) that supports at least two communication technologies, such as a PLC technology and an RF technology, so as to implement communication between different communication technologies of the multimode device. In the hybrid network communication method provided in this application, a plurality of routes to the multimode device are established on a gateway device based on an IPv6 address that uniquely identifies the multimode device. An upper-layer application may access the multimode device based on the IPv6 address of the multimode device by using any communication technology (any physical interface) supported by the multimode device, so that the upper-layer application does not need to perceive or select a specific communication protocol or physical interface. Each technology supported by the multimode device corresponds to a physical interface. For example, a multimode device that supports the PLC technology and the RF technology includes a PLC physical interface and an RF physical interface.

Figure 1:
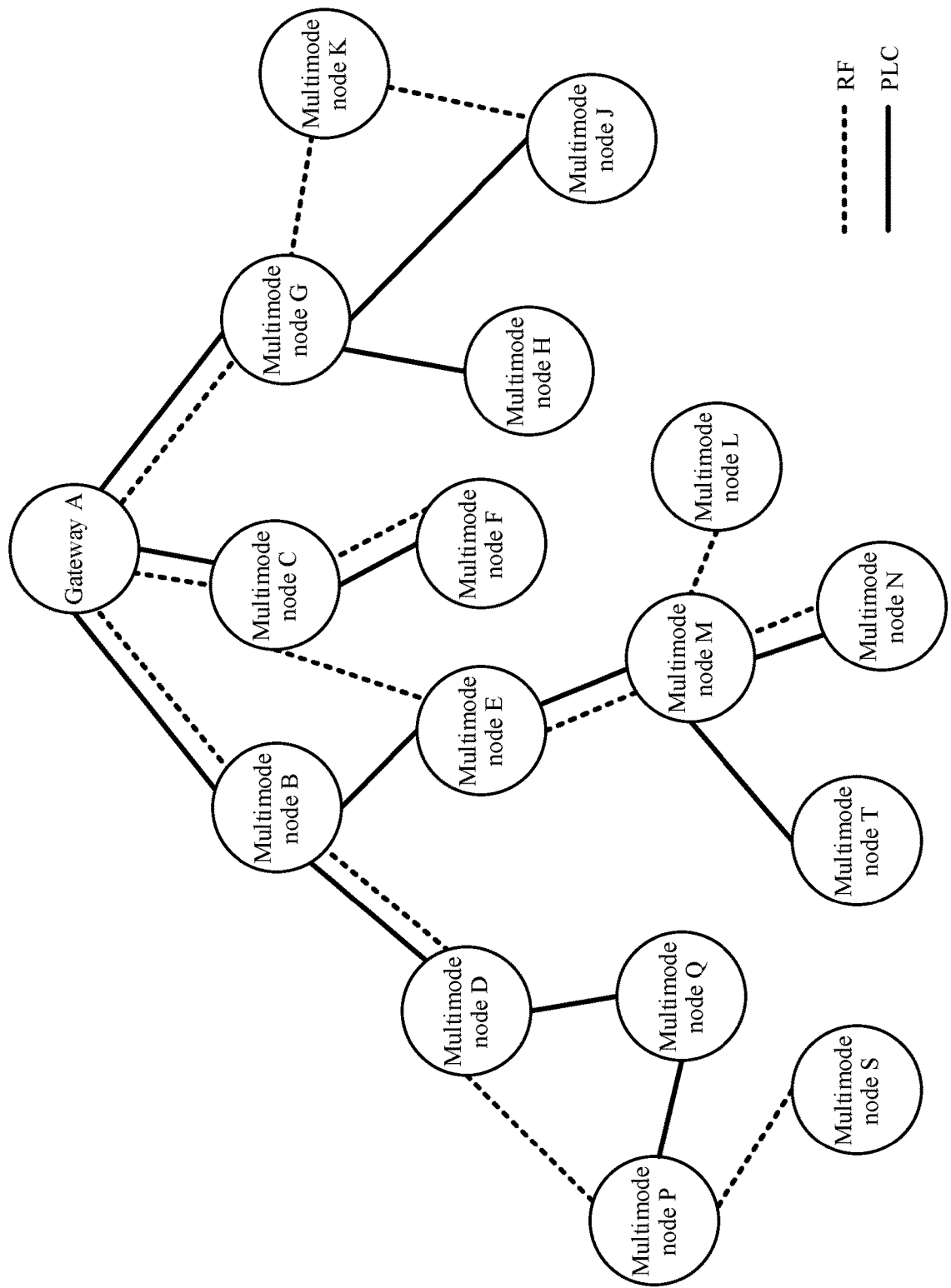
FIG. 1 is a diagram of a PLC-RF hybrid network according to an embodiment of this application.

The following uses hybrid networking supporting the PLC technology and the RF technology as an example to describe the technical solutions of this application. FIG. 1 is a network diagram of PLC-RF hybrid network according to an embodiment of this application.

Generally, a PLC network includes devices in three roles: a central coordinator (CCO), a proxy coordinator (PCO), and a station (STA). An RF network includes devices in three roles: a central device, a proxy device, and an end device. In the PLC-RF hybrid network provided in this embodiment of this application, a gateway device implements functions of the CCO in the PLC network and the central device in the RF network, and a multimode device implements functions of the PCO and the STA in the PLC network, and functions of the proxy device and the end device in the RF network.

Figure 2:
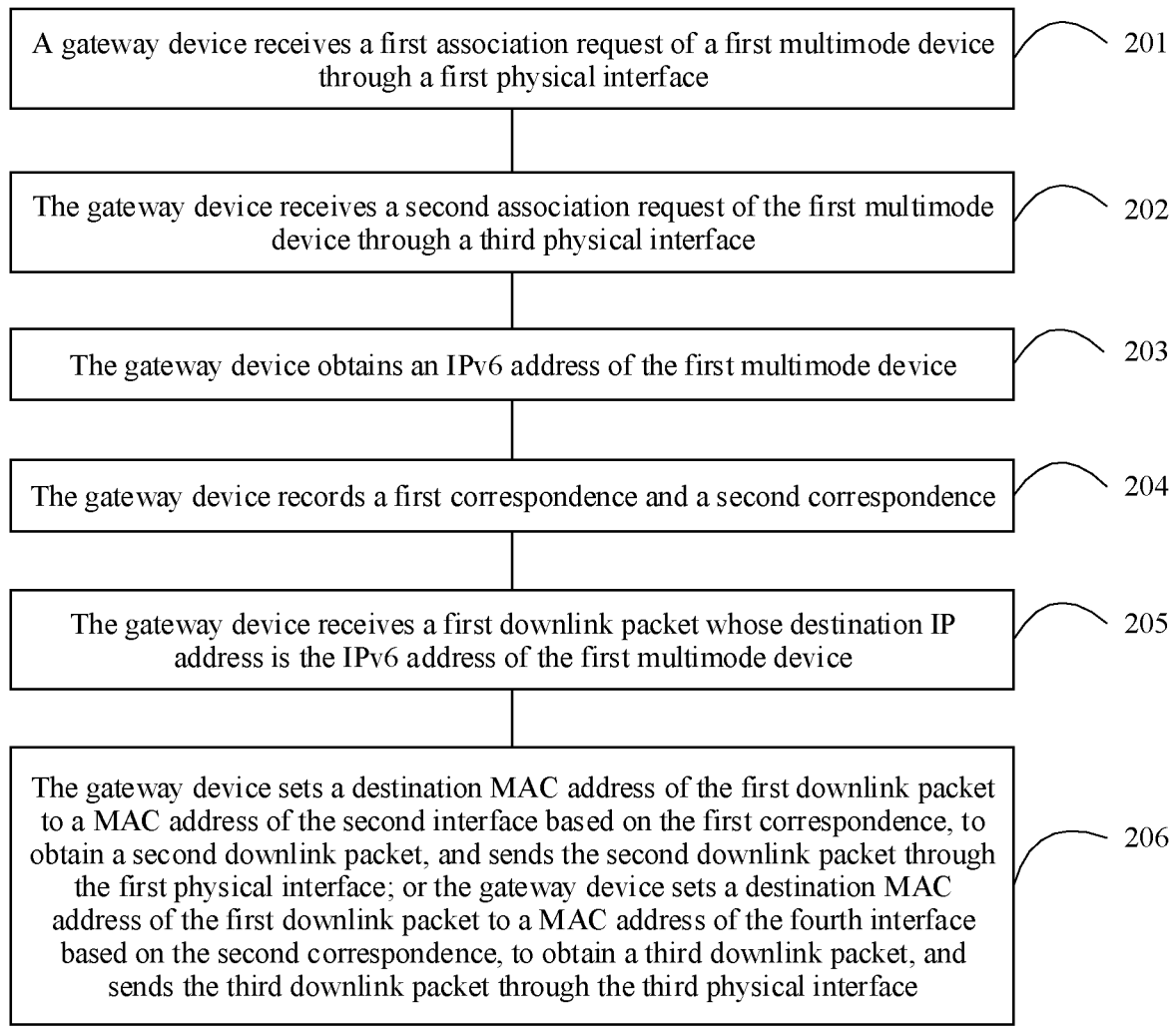
FIG. 2 is a flowchart of a hybrid network communication method according to an embodiment of this application.

As shown in FIG. 2, a hybrid network communication method provided in an embodiment of this application includes the following step.

Step 201: A gateway device receives a first association request of a first multimode device through a first physical interface, where the first association request includes a MAC address of a second physical interface, the first multimode device supports a first communication protocol and a second communication protocol, the first physical interface is a physical interface of the gateway device, the second physical interface is a physical interface of the first multimode device, and a protocol type used by the first physical interface and the second physical interface is the first communication protocol.

Step 202: The gateway device receives a second association request of the first multimode device through a third physical interface, where the second association request includes a MAC address of a fourth physical interface, the third physical interface is a physical interface of the gateway device, the fourth physical interface is a physical interface of the first multimode device, and a protocol type used by the third physical interface and the fourth physical interface is the second communication protocol.

For example, the first communication protocol is a PLC communication protocol, and the second communication protocol is an RF communication protocol.

Step 201 may be performed before or after step 202, or step 201 and step 202 may be performed at the same time.

Step 203: The gateway device obtains an IPv6 address of the first multimode device.

The IPv6 address of the first multimode device may be a global unicast address, for example, an IPv6 address starting with 2000::/3; or may be a unique local address (ULA). The ULA is an IPv6 address starting with FC00::/7.

In an embodiment, IPv6 address prefixes of the entire network may be preconfigured. The first multimode device locally generates the IPv6 address of the first multimode device. For example, the IPv6 address of the first multimode device is a ULA. Then, the first multimode device sends an address advertisement message to the gateway device, where the address advertisement message includes the MAC address of the second physical interface, the MAC address of the fourth physical interface, and the IPv6 address of the first multimode device.

In an embodiment, the gateway device sends a configuration message to the first multimode device, where the configuration message includes an IPv6 address prefix, for example, 2002::/64 or FC06::/64. Then, the first multimode device generates the IPv6 address of the first multimode device based on the IPv6 address prefix. Then, the first multimode device sends an address advertisement message to the gateway device, where the address advertisement message includes the MAC address of the second physical interface, the MAC address of the fourth physical interface, and the IPv6 address of the first multimode device. The MAC address of the second physical interface, the MAC address of the fourth physical interface, and the IPv6 address of the first multimode device in the address advertisement message may be placed together, for example, placed in a payload, or may be located placed in different fields.

The address advertisement message in the first embodiment and the second embodiment may alternatively include a first message and a second message. For example, the first message includes the MAC address of the second physical interface and the IPv6 address of the first multimode device, and the second message includes the MAC address of the fourth physical interface and the IPv6 address of the first multimode device.

In a third embodiment, the first multimode device requests, according to a DHCP, the gateway device to assign an IP address. The first multimode device sends a DHCP request, where the request includes the MAC address of the second physical interface and the MAC address of the fourth physical interface. The gateway device assigns an IPv6 address from an address pool to the first multimode device, and sends the IPv6 address of the first multimode device to the first multimode device based on a DHCP response message.

Figure 3:
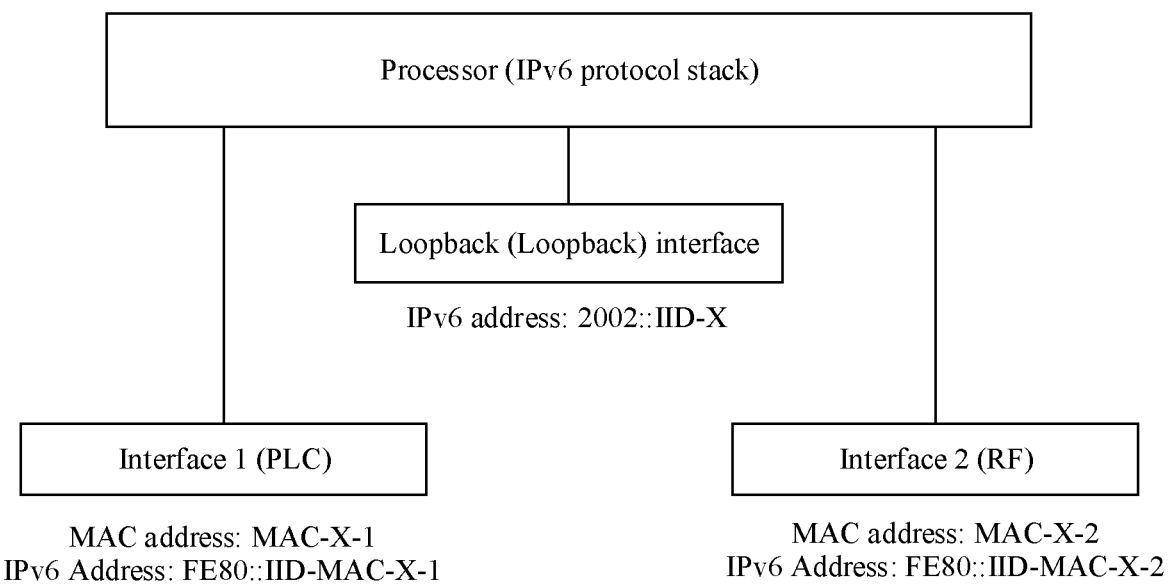
FIG. 3 is a diagram of interfaces of a multimode device X according to an embodiment of this application.

An IPv6 address of a multimode device X in FIG. 3 is a global unicast address 2002::IID-X, and is generated based on a MAC address of any physical interface of the multimode device X in a stateless address autoconfiguration (SLAAC) manner. For the generation manner, refer to Table 1. In Table 1, the IPv6 address of the multimode device X is generated by using a MAC address MAC-X-1 of a physical interface 1 of the multimode device X. Certainly, the IPv6 address of the multimode device X may alternatively be generated by using a MAC address MAC-X-2 of the physical interface 2 of the multimode device X.

TABLE 1

| 2002:: | First 24 bits of MAC-X-1, where the seventh bit is inverted | FFFE | Last 24 bits of MAC-X-1 |
|---|---|---|---|

Generally, a MAC address includes 48 bits. If the MAC address uses a 64-bit extended unique identifier (EUI-64), a 64-bit IPv6 address prefix is directly added before a result obtained after the seventh bit of the MAC address is inverted (without a need to insert FFFE shown in Table 1).

The IPv6 address of the multimode device may be configured on a loopback interface of the multimode device X, as shown in FIG. 3. During implementation, the IPv6 address of the multimode device may alternatively be configured for each physical interface.

Step 204: The gateway device records a first correspondence and a second correspondence, where the first correspondence includes a correspondence among the IPv6 address of the first multimode device, the MAC address of the second physical interface, and the first physical interface, and the second correspondence includes a correspondence among the IPv6 address of the first multimode device, the MAC address of the fourth physical interface, and the third physical interface.

After determining the IPv6 address of the first multimode device, the gateway device may obtain the first correspondence and the second correspondence based on the first association request and the second association request.

If a physical interface is directly connected to only one device, that is, if the physical interface is not connected to a shared medium, only a name of an interface (for example, a port number of an Ethernet interface of an optical fiber or a twisted pair cable) needs to be recorded in a correspondence. If a physical interface is connected to a shared medium, a signal sent from the physical interface may be received by at least two devices. Therefore, an identifier (for example, a MAC address) of a directly connected device from which an association request is received is recorded in a correspondence. One identifier corresponds to one link connected to the physical interface. Therefore, the MAC address may be used to represent the physical interface.

Optionally, the first correspondence and the second correspondence further include a routing metric. The first correspondence includes a correspondence among the IPv6 address of the first multimode device, the MAC address of the second physical interface, the first physical interface, and a first routing metric. The second correspondence includes a correspondence among the IPv6 address of the first multimode device, the MAC address of the fourth physical interface, the third physical interface, and a second routing metric.

In this application, the routing metric may be fixedly set according to a communication protocol of a physical interface, or may be obtained based on a link-layer quality parameter used when a physical interface accesses a network. For example, a routing metric of a PLC interface is obtained based on a level of the PLC interface, channel quality, a communication rate, and the like; and a routing metric of an RF interface is obtained based on a RANK value of the RF interface. This is not limited in this embodiment of this application.

In this embodiment of this application, a correspondence table of the gateway device shown in the following Table 2 may be used to record the first correspondence and the second correspondence. The first correspondence is used as an example. In Table 2, a destination IPv6 address entry is used to record the IPv6 address of the first multimode device, a destination physical interface entry is used to record the MAC address of the second physical interface, and a next-hop physical interface entry is used to record the first physical interface. Table 2 shows a first correspondence (Index 1) and a second correspondence (Index 2) that are recorded by a gateway device A and a multimode device E in the PLC-RF hybrid network shown in FIG. 1.

TABLE 2

| Index (Index) | Destination IPv6 address | Destination physical interface | Next-hop physical interface | Routing metric |
|---|---|---|---|---|
| 1 | 2002::IID-E | MAC-E-1 | MAC-B-1 | 70 |
| 2 | 2002::IID-E | MAC-E-2 | MAC-C-2 | 80 |

TABLE 2-continued

| Index (Index) | Destination IPv6 address | Destination physical interface | Next-hop physical interface | Routing metric |
|---|---|---|---|---|
| 3 | 2002::IID-B | MAC-B-1 | MAC-B-1 | 30 |
| 4 | 2002::IID-B | MAC-B-2 | MAC-B-2 | 50 |
| 5 | 2002::IID-C | MAC-C-1 | MAC-C-1 | 30 |
| 6 | 2002::IID-C | MAC-C-2 | MAC-C-2 | 40 |

In the PLC-RF hybrid network shown in FIG. 1, because PLC and RF physical interfaces are connected to a shared medium, in the first correspondence that is of the multimode device E and that is recorded by the gateway device A in Table 2, a MAC address of the first physical interface is a MAC address of a physical interface of a directly connected device (a multimode device B) from which a first association request is received by the gateway A, that is, MAC-B-1. In the second correspondence that is of the multimode device E and that is recorded by the gateway device A, a MAC address of the third physical interface is a MAC address of a physical interface of a directly connected device (a multimode device C) from which a second association request is received by the gateway A, that is, MAC-C-2.

During implementation, an IPv6 link-local address may alternatively be generated for each physical interface of the multimode device. As shown in FIG. 3, an IPv6 link-local address of the physical interface 1 of the multimode device X is represented by FE80::IID-MAC-X-1, and is generated based on the MAC address MAC-X-1 of the physical interface 1 of the multimode device X in a SLAAC manner. Similarly, an IPv6 link-local address of the physical interface 2 is FE80::IID-MAC-X-2, and is generated based on the MAC address MAC-X-2 of the physical interface 2 of the multimode device X in a SLAAC manner. For the generation manner, refer to Table 3.

TABLE 3

| FE80:: | First 24 bits of MAC-X-1, where the seventh bit is inverted | FFFE | Last 24 bits of MAC-X-1 |
|---|---|---|---|
| FE80:: | First 24 bits of MAC-X-2, where the seventh bit is inverted | FFFE | Last 24 bits of MAC-X-2 |

Optionally, the first correspondence and the second correspondence each may further include an IPv6 link-local address of a physical interface. During implementation, four tables (Tables 4-1, 4-2, 4-3, and 4-4) may be used to record the first correspondence and the second correspondence. Table 4-1 may be considered as a conventional routing table, Table 4-2 may be considered as a conventional neighbor table, and Tables 4-3 and 4-4 may be considered as conventional MAC forwarding tables. Table 4-3 is a PLC-link MAC forwarding table, and Table 4-4 is an RF-link MAC forwarding table. During implementation, two or three tables may be used to record the first correspondence and the second correspondence. The implementation is not limited in this application.

TABLE 4-1

Routing table of the gateway device A

| Index (Index) | Destination address | Next hop (NextHop) | Outbound interface | Routing metric (Metric) |
|---|---|---|---|---|
| 1 | 2002::IID-E | FE80::IID-MAC-E-1 | PLC | 70 |
| 2 | 2002::IID-E | FE80::IID-MAC-E-2 | RF | 80 |

TABLE 4-1-continued

Routing table of the gateway device A

| Index (Index) | Destination address | Next hop (NextHop) | Outbound interface | Routing metric (Metric) |
|---|---|---|---|---|
| 3 | 2002::IID-B | FE80::IID-MAC-B-1 | PLC | 30 |
| 4 | 2002::IID-B | FE80::IID-MAC-B-2 | RF | 50 |
| 5 | 2002::IID-C | FE80::IID-MAC-C-1 | PLC | 30 |
| 6 | 2002::IID-C | FE80::IID-MAC-C-2 | RF | 40 |

TABLE 4-2

Neighbor table of the gateway device A

| Index | IP address | MAC address | Outbound interface | Lifetime (Lifetime) |
|---|---|---|---|---|
| 1 | FE80::IID-MAC-E-1 | MAC-E-1 | PLC | Reachable |
| 2 | FE80::IID-MAC-E-2 | MAC-E-2 | RF | Reachable |
| 3 | FE80::IID-MAC-B-1 | MAC-B1 | PLC | Reachable |
| 4 | FE80::IID-MAC-B-2 | MAC-B2 | RF | Reachable |
| 5 | FE80::IID-MAC-C-1 | MAC-C-1 | PLC | Reachable |
| 6 | FE80::IID-MAC-C-2 | MAC-C-2 | RF | Reachable |

TABLE 4-3

PLC-link MAC forwarding table of the gateway device A

| Index | Destination MAC address | Directly connected MAC address |
|---|---|---|
| 1 | MAC-E-1 | MAC-B-1 |
| 2 | MAC-B-1 | MAC-B-1 |
| 3 | MAC-C1 | MAC-C-1 |

TABLE 4-4

RF-link MAC forwarding table of the gateway device A

| Index | Destination MAC address | Directly connected MAC address |
|---|---|---|
| 1 | MAC-E-2 | MAC-C-2 |
| 2 | MAC-B-2 | MAC-B-2 |
| 3 | MAC-C-2 | MAC-C-2: |

If the two physical interfaces of the first multimode device use a same MAC address, different IPv6 link-local addresses may be generated for the two interfaces based on the MAC address for differentiation. Refer to Table 3. Because MAC addresses are the same, FFFE may be added between first 24 bits and last 24 bits of the MAC address for one IPv6 link-local address, and FFFD may be added between first 24 bits and last 24 bits of the MAC address for the other IPv6 link-local address. In this case, it is recommended that Tables 4-1 to 4-4 be used to record the first correspondence and the second correspondence.

Step 205: The gateway device receives a first downlink packet whose destination IP address is the IPv6 address of the first multimode device.

After the gateway device obtains the first correspondence and the second correspondence, a subsequent packet whose destination IP address is the IPv6 address of the first multimode device may be sent to the first multimode device.

Step 206: The gateway device sets a destination MAC address of the first downlink packet to the MAC address of the second physical interface based on the first correspondence, to obtain a second downlink packet, and sends the second downlink packet through the first physical interface; or the gateway device sets a destination MAC address of the first downlink packet to the MAC address of the fourth physical interface based on the second correspondence, to obtain a third downlink packet, and sends the third downlink packet through the third physical interface.

The gateway device may randomly forward the first downlink packet based on the first correspondence or the second correspondence. Alternatively, the gateway device may forward the first downlink packet by selecting the first correspondence or the second correspondence based on routing metrics, for example, by selecting a correspondence with a smaller routing metric in the first correspondence and the second correspondence.

Step 207: The first multimode device receives a first notification from the gateway device through the second physical interface, where the first notification includes the MAC address of the first physical interface.

Step 208: The first multimode device receives a second notification from the gateway device through the fourth physical interface, where the second notification includes the MAC address of the third physical interface.

Optionally, the first notification is a beacon frame of the first communication protocol, and the second notification is a beacon frame of the second communication protocol. Correspondingly, the first notification and the second notification may further include parameters such as a network identifier and a networking sequence number.

Alternatively, the first notification is a first association response message in response to the first association request. The second notification is a second association response message in response to the second association request.

Step 209: The first multimode device records a first default gateway correspondence and a second default gateway correspondence, where the first default gateway correspondence includes a correspondence among a default IP address, the MAC address of the first physical interface, and the second physical interface; and the second default gateway correspondence includes a correspondence among the default IP address, the MAC address of the third physical interface, and the fourth physical interface.

The default IP address is typically a fully-matched IPv6 address, and is expressed as ::/0. A route to the default IP address may be understood as a route to the gateway device. Therefore, packets forwarded based on the first default gateway correspondence and the second default gateway correspondence are all sent to the gateway device.

Optionally, the first default gateway correspondence and the second default gateway correspondence each further include a gateway routing metric. The first default gateway correspondence includes a correspondence among the default IP address, the MAC address of the second physical interface, the first physical interface, and a first gateway routing metric. The second default gateway correspondence includes a correspondence among the default IP address, the MAC address of the fourth physical interface, the third physical interface, and a second gateway routing metric.

In this embodiment of this application, the first multimode device may record the first default gateway correspondence and the second default gateway correspondence by using Table 5 that is in a same format as Table 1. The following Table 5 shows the first default gateway correspondence and the second default gateway correspondence that are recorded by the multimode device E in the PLC-RF hybrid network shown in FIG. 1.

TABLE 5

Correspondence table of the multimode device E

| Destination IPv6 address | Destination physical interface | Next-hop physical interface | Routing metric (Metric) |
|---|---|---|---|
| ::/0 | MAC-A-1 | MAC-B-1 | 70 |
| ::/0 | MAC-A-2 | MAC-C-2 | 80 |

Certainly, the first multimode device may alternatively record the first default gateway correspondence and the second default gateway correspondence by using four tables such as Tables 6-1, 6-2, 6-3, and 6-4.

TABLE 6-1

Routing table of the multimode device E

| Index | Destination address | Next hop (NextHop) | Outbound interface (Interface) | Routing metric (Metric) | Protocol type (Protocol) |
|---|---|---|---|---|---|
| 1 | ::/0 | FE80::IID-MAC-A-1 | PLC | 70 | L2-PLC |
| 2 | ::/0 | FE80::IID-MAC-A-2 | RF | 80 | L2-RF |

TABLE 6-2

Neighbor table of the multimode device E

| Index | IP address | MAC address | Outbound interface (Interface) | Lifetime (Lifetime) |
|---|---|---|---|---|
| 1 | FE80::IID-MAC-A-1 | MAC-A-1 | PLC | Permanent |
| 2 | FE80::IID-MAC-A-2 | MAC-A-2 | PLC | Permanent |

TABLE 6-3

PLC-link MAC forwarding table of the multimode device E

| Index | Destination MAC address | Directly connected MAC address |
|---|---|---|
| 1 | MAC-A-1 | MAC-B-1 |

TABLE 6-4

RF-link MAC forwarding table of the multimode device E

| Index | Destination MAC address | Directly connected MAC address |
|---|---|---|
| 1 | MAC-A-2 | MAC-C-2 |

In this embodiment of this application, the entry "protocol type (Protocol)" in the routing table is optional. The entry "lifetime (Lifetime)" in the neighbor table may be set in a conventional manner or in a system default manner. For example, "Permanent" indicates that the lifetime is not updated, and "Reachable" indicates the lifetime can be updated to different states. For details, refer to an update manner in a conventional neighbor table.

Step 210: When the first multimode device sends a first uplink packet, the first multimode device sets a destination MAC address of the first uplink packet to the MAC address of the first physical interface based on the first default gateway correspondence, to obtain a second uplink packet, and sends the second uplink packet through the second physical interface; or the multimode device sets a destination MAC address of the first uplink packet to the MAC address of the third physical interface based on the second default gateway correspondence, to obtain a third uplink packet, and sends the third uplink packet through the fourth physical interface.

The first multimode device needs to send the first uplink packet, for example, a UDP packet, to a second multimode device. If the first multimode device selects the first default gateway correspondence, namely, the first communication protocol such as a PLC communication protocol, to communicate with the second multimode device, the first multimode device first sends the first uplink packet to the gateway device based on a default gateway correspondence, and then the gateway device forwards the first uplink packet to the second multimode device based on a correspondence between the gateway device and the second multimode device.

To improve network security, link layer encryption may be performed for communication between devices in the hybrid network. A link-layer key used for link-layer encryption is generated by the gateway device, and is sent to each multimode device in the hybrid network. The gateway device needs to perform network access authentication on each multimode device, and negotiate a key with the multimode device to generate a master key, so that the link-layer key and a network parameter when delivered can be encrypted by using the master key obtained through negotiation for transmission. Optionally, the gateway device further performs network access authentication on the first multimode device, and negotiates a key with the first multimode device. This may be implemented using technologies such as datagram transport layer security (DTLS), an extensible authentication protocol (EAP), and transport layer security (TLS).

In the hybrid network communication method provided in this embodiment of this application, transmission between the multimode device and the gateway device is performed through direct delivery at the layer 3, and forwarding is performed hop by hop at the link layer. For example, in an IP route view, in the PLC-RF hybrid network shown in FIG. 1, transmission between the multimode device E and the gateway device A is performed through direct delivery. Actually, there are two links between the multimode device E and the gateway device A at the link layer. In this way, when an upper-layer application accesses the multimode device based on the IPv6 address of the multimode device, all packets are sent to the gateway device, and the gateway device determines a layer-2 forwarding link. Therefore, the multimode device and the upper-layer application do not need to sense switching of a forwarding link, thereby improving efficiency and flexibility of hybrid network communication.

The following describes in detail a hybrid network communication method provided in this application with reference to the PLC-RF hybrid network in FIG. 1.

Figure 4:
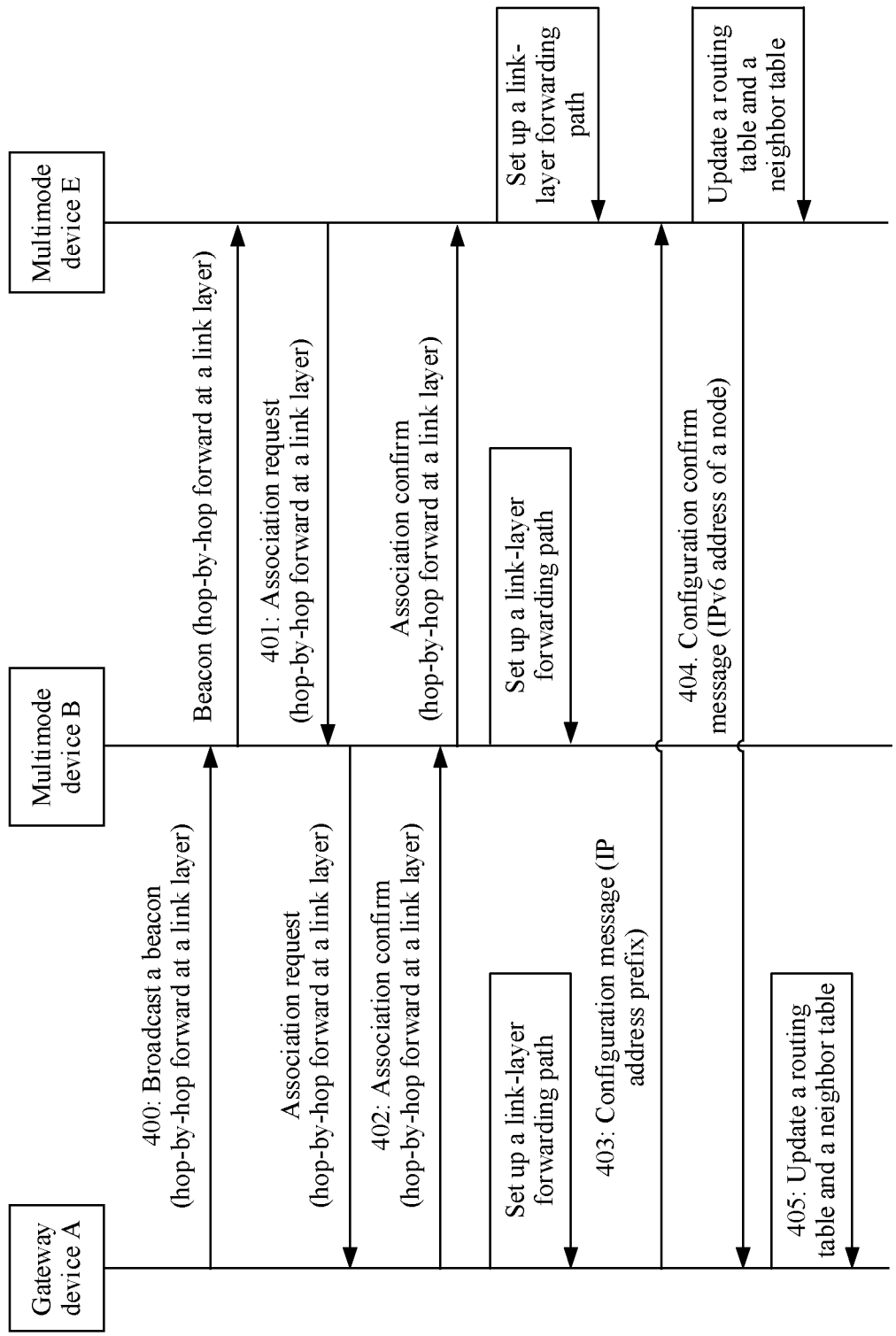
FIG. 4 is a flowchart of a communication method applied in hybrid networking according to an embodiment of this application.

FIG. 4 is a flowchart of a hybrid network communication method according to an embodiment of this application. As shown in FIG. 4, the method includes the following steps.

Step 401: A multimode device E sends a first association request to a gateway device A through a first PLC interface of the multimode device E, and sends a second association request to the gateway device through a first RF interface of the multimode device E.

The first association request includes a MAC address of the first PLC interface, for example, MAC-E-1. The association request is generally an association request defined in a protocol, for example, an association request defined in IEEE 1901.1 or IEEE 1901.2.

The second association request includes a MAC address of the first RF interface, for example, MAC-E-2. The second association request may be an association request defined in IEEE 802.15.4.

The gateway device A receives the first association request through a second PLC interface of the gateway device A, and receives the second association request through a second RF interface of the gateway device A.

Figure 7:
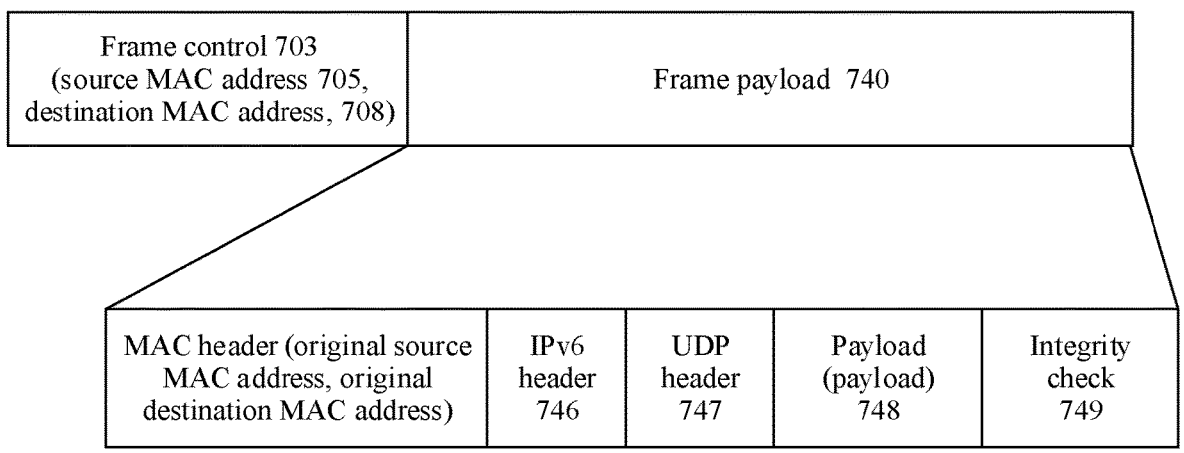
FIG. 7 is a diagram of an MPDU format according to an embodiment of this application.

FIG. 7 is a diagram of a format of a MAC layer protocol data unit (MPDU) 700. As shown in FIG. 7, the MPDU 700 includes a frame control field 703 and a frame payload field 740. The frame control field 703 includes a source MAC address 705 and a destination MAC address 708, and is used for hop-by-hop forwarding of the MPDU 700 at the link layer. The frame payload field 740 includes a MAC header 741, an IPv6 packet header 746, a UDP packet header 747, a payload 748, and the like. The MAC header 741 includes an original source MAC address 743 and an original destination MAC address 744.

The source MAC address 705 and the destination MAC address 708 in the frame control field 703 change hop by hop. The original source MAC address 743 and the original destination MAC address 744 in the frame payload field 740 remain unchanged. In the following descriptions, a source MAC address and a destination MAC address are respectively the source MAC address and the destination MAC address in the frame control field 703, unless otherwise specified. An original source MAC address and an original destination MAC address are respectively the original source MAC address 743 and the original destination MAC address 744 in the MAC header in the frame payload field 740.

An association request sent by the multimode device E to the gateway device A is used as an example. In the first association request sent by the multimode device E, a source MAC address is the MAC address (MAC-E-1) of the first PLC interface, a destination MAC address is a link (MAC-B-1) (a MAC address of a third PLC interface of a multimode device B) between the first PLC interface and the multimode device B, an original source MAC address is the MAC address (MAC-E-1) of the first PLC interface, and an original destination MAC address is a MAC address (MAC-A-1) of the second PLC interface. After receiving the first association request from the third PLC interface, the multimode device B sets the source MAC address to MAC-B-1, sets the destination MAC address to MAC-A-1, and the original source MAC address and the original destination MAC address remain unchanged. Therefore, in a first association confirm received by the gateway device A, the source MAC address is MAC-B-1, the destination MAC address is MAC-A-1, and the original source MAC address is MAC-E-1. This indicates that the gateway device A receives the first association request over the link (MAC-B-1) between the second PLC interface and the multimode device B. In this way, the gateway device A may record a partial correspondence in a first correspondence based on the received first association request, that is, a correspondence between a first physical interface and a second physical interface. A correspondence between a destination physical interface (MAC-E-1) and a next-hop physical interface (MAC-B-1) is recorded in Table 2. A correspondence between a destination MAC address (MAC-E-1) and a directly connected MAC address (MAC-B-1) is recorded in Table 4-3.

Optionally, before step 401, the method further includes step 400: The gateway device A broadcasts a first beacon frame through the second PLC interface, where the first beacon frame includes the MAC address (MAC-A-1) of the second PLC interface; and the gateway device A broadcasts a second beacon frame through the second RF interface, where the second beacon frame includes a MAC address (MAC-A-2) of the second RF interface. Correspondingly, the multimode device E receives the first beacon frame over the link (represented by MAC-B-1) between the first PLC interface and the multimode device B, and receives the second beacon frame over a link (represented by MAC-C-2) between the first RF interface and a multimode device C. The multimode device E may record a first default gateway correspondence, including a default IP address (::/0), the MAC address (MAC-A-1) of the second PLC interface, and a correspondence between the first PLC interface and the link (MAC-B-1) of the multimode device B; and record a second default gateway correspondence, including the default IP address (::/0), the MAC address (MAC-A-2) of the second RF interface, and a correspondence between the link (MAC-C-2) between the first RF interface and the multimode device C, as listed in Table 5 or Tables 6-1 to 6-4.

The first beacon frame may further include some link parameters such as a PLC transmit power and a PLC channel parameter, and may further include some network parameters such as a network identifier and a networking sequence number. The second beacon frame may further include some link parameters such as an RF transmit power and an RF channel parameter, and may further include some network parameters such as a network identifier and a networking sequence number.

Optionally, the multimode device E may complete time synchronization with the gateway device A based on the first beacon frame and the second beacon.

Optionally, before or after step 401, the multimode device E may generate an IPv6 link-local address (FE80::IID-MAC-E-1) of the first PLC interface based on the MAC address of the first PLC interface, and generate an IPv6 link-local address (FE80::IID-MAC-E-2) of the first RF interface based on the MAC address of the first RF interface. For a specific generation manner, refer to the foregoing description. Details are not described herein again.

Optionally, the first association request may further include the IPv6 link-local address of the first PLC interface, and the second association request may further include the IPv6 link-local address of the first RF interface, so that the gateway device directly obtains the IPv6 link-local address of the first PLC interface and the IPv6 link-local address of the first RF interface. Certainly, when the association request includes no IPv6 link-local address of the first protocol interface, the gateway device may alternatively obtain the IPv6 link-local address of the first PLC interface and the IPv6 link-local address of the first RF interface based on MAC addresses and in a link-local address generation manner. The gateway device A may further establish a correspondence between an IPv6 link-local address and a MAC address in Table 4-2, for example, a correspondence between the link-local address (FE80::IID-MAC-E-1) of the first PLC interface and the MAC address (MAC-E-1) of the first PLC interface.

Step 402: The gateway device A returns the first association confirm to the multimode device E through the second PLC interface, and returns a second association confirm to the multimode device E through the second RF interface.

The first association confirm includes the MAC address of the second PLC interface, and the second association confirm includes the MAC address of the second RF interface.

The first association confirm includes a first request result: association success or association failure.

The second association confirm includes a second request result: association success or association failure.

After receiving the first association request, the gateway device may directly return a first association confirm in which the first request result is association success. After receiving the first association request, the gateway device may perform ownership checking, for example, verify whether the MAC address of the first PLC interface of the multimode device E is in an address whitelist. If the MAC address is in the address whitelist, the gateway device may return an association success. If the MAC address is not in the address whitelist, the gateway device may return an association failure. Processing of the second association request is similar. Details are not described herein again.

Correspondingly, the multimode device E receives the first association confirm over the link (represented by MAC-B-1) between the first PLC interface and the multimode device B, and receives the second association confirm over the link (represented by MAC-C-2) between the first RF interface and the multimode device C. If the first request result and the second request result each are an association success, and the multimode device E has not recorded the first default gateway correspondence and the second default gateway correspondence, the multimode device E may record the first default gateway correspondence and the second default gateway correspondence based on the first association confirm and the second association confirm. Reference may be made to Table 5 or Tables 6-1 to 6-4.

If the request results each are an association failure, the first multimode device may continue to send an association request to the gateway device A, or may attempt to join another network.

For example, the gateway device A returns the first association confirm to the multimode device E. In the first association confirm sent by the gateway device A, a source MAC address is the MAC address (MAC-A-1) of the second PLC interface, a destination MAC address is the MAC address (MAC-B-1) of the third PLC interface of the multimode device B, an original source MAC address is the MAC address (MAC-A-1) of the second PLC interface, and an original destination MAC address is the MAC address (MAC-E-1) of the first PLC interface. After receiving the first association confirm, the multimode device B sets the source MAC address to MAC-B-1, the destination MAC address to MAC-E-1, and the original source MAC address and the original destination MAC address remain unchanged. Therefore, in the first association confirm received by the multimode device E, the source MAC address is MAC-B-1, and the destination MAC address is MAC-E-1. This indicates that the multimode device E receives the first association confirm over the link between the first PLC interface and the multimode device B. The multimode device E may record the first default gateway correspondence based on the first association confirm.

Step 403: The gateway device A sends a configuration message to the multimode device E, where the configuration message includes an IPv6 address prefix.

The gateway device A may send, to the multimode device E, the configuration message including the IPv6 address prefix that is used as a payload. A source MAC address of the configuration message is the MAC address (MAC-A-1) of the second PLC interface, a destination MAC address is the MAC address (MAC-B-1) of the third PLC interface of the multimode device B, an original source MAC address is the MAC address (MAC-A-1) of the second PLC interface, and an original destination MAC address is the MAC address (MAC-E-1) of the first PLC interface. Alternatively, a source MAC address of the configuration message is the MAC address (MAC-A-2) of the second RF interface, a destination MAC address is the MAC address (MAC-C-2) of the third RF interface of the multimode device C, an original source MAC address is the MAC address (MAC-A-2) of the second RF interface, and an original destination MAC address is the MAC address (MAC-E-2) of the first RF interface.

If the entire hybrid network uses one IPv6 address prefix, the configuration message may alternatively be a broadcast message, and is broadcast through the second PLC interface or the second RF interface.

The configuration message may further include a link-layer key. Correspondingly, before sending the configuration message, the gateway device A further performs network access authentication on the multimode device B, and negotiates a master key with the multimode device B. The configuration message is further encrypted by using the master key obtained through negotiation between the gateway device A and the multimode device B.

Step 404: The multimode device E generates an IPv6 address of the multimode device E based on the IPv6 address prefix, and sends a configuration response message to the gateway device A, where the configuration response message includes the IPv6 address of the multimode device E, the MAC address of the first PLC interface, and the MAC address of the first RF interface.

Step 405: The gateway device A records the first correspondence and a second correspondence based on the configuration response message.

In an implementation, the multimode device E sends the configuration response message, where an original source MAC address is the MAC address (MAC-E-1) of the first PLC interface, and an original destination MAC address is the MAC address (MAC-A-1) of the second PLC interface. If the payload carries the MAC (MAC-E-2) of the first RF interface and the IPv6 address of the multimode device E, the gateway device A may generate the first correspondence and the second correspondence based on the configuration response message and the foregoing partial correspondence that is recorded based on the first association request and the second association request.

In another implementation, the configuration response message includes a first response message and a second response message. In the first response message, an original source MAC address is the MAC address (MAC-E-1) of the first PLC interface, an original destination MAC address is the MAC address (MAC-A-1) of the second PLC interface, and a payload carries the IPv6 address of multimode device E. In the second response message, an original source MAC address is the MAC address (MAC-E-2) of the first RF interface, an original destination MAC address is the MAC address (MAC-A-2) of the second RF interface, and a payload carries the IPv6 address of the multimode device E. The gateway device A records the first correspondence based on the first response message, and records the second correspondence based on the second response message.

In this embodiment of this application, the PLC-RF hybrid network is used as an example. PLC communication protocols may include IEEE 1901.1, IEEE 1901.2, the State Grid Corporation of China Q/GDW 11612, and other protocols. RF communication protocols may include wireless highway addressable remote transducer (Wireless HART), ZigBee, wireless networks for industrial automation process automation (WIA-PA), high-speed power line communication HPLC (Q/GDW 11016-2013) of State Grid Corporation of China, and other protocols.

After the multimode device E completes network access (that is, joining the hybrid network of the gateway device A), the multimode device E may serve as a proxy node to allow another multimode device, such as a multimode device M in FIG. 1, to join the hybrid network via the multimode device E. Refer to FIG. 1. Before the multimode device E accesses the network, the multimode device B and the multimode device C have completed network access. For a network access process of the multimode device B and the multimode device C, refer to the method shown in FIG. 2. Details are not described herein again. Therefore, refer to Table 2. The gateway device A records a third correspondence (Index 3) and a fourth correspondence (Index 4) of the multimode device B, and a fifth correspondence (Index 5) and a sixth correspondence (Index 6) of the multimode device C. In addition, the multimode device B records a third default gateway correspondence and a fourth default gateway correspondence, as shown in the following Table 7 or Tables 7-1 to 7-4. The multimode device C records a fifth default gateway correspondence and a sixth default gateway correspondence, as shown in the following Table 8 or Tables 8-1 to 8-4.

TABLE 7

Correspondence table of the multimode device B

| Destination IPv6 address | Destination physical interface | Next-hop physical interface | Routing metric (Metric) |
|---|---|---|---|
| ::/0 | MAC-A-1 | MAC-A-1 | 30 |
| ::/0 | MAC-A-2 | MAC-A-2 | 40 |

TABLE 7-1

Routing table of the multimode device B

| Index (Index) | Destination (Destination) | Next hop (NextHop) | Outbound interface (Interface) | Routing metric (Metric) | Protocol type (Protocol) |
|---|---|---|---|---|---|
| 1 | ::/0 | FE80::IID-MAC-A-1 | PLC | 30 | L2-PLC |
| 2 | ::/0 | FE80::IID-MAC-A-2 | RF | 40 | L2-RF |

TABLE 7-2

Neighbor table of the multimode device B

| Index (Index) | IP address | MAC address | Outbound interface (Interface) | Lifetime (Lifetime) |
|---|---|---|---|---|
| 1 | FE80::IID-MAC-A-1 | MAC-A-1 | PLC | Reachable |
| 2 | FE80::IID-MAC-A-2 | MAC-A-2 | RF | Reachable |

TABLE 7-3

PLC-link MAC forwarding table of the multimode device B

| Index | Destination MAC address | Next-hop MAC address |
|---|---|---|
| 1 | MAC-A-1 | MAC-A-1 |
| 2 | MAC-E-1 | MAC-E-1 |

TABLE 7-4

RF-link MAC forwarding table of the multimode device B

| Index (Index) | Destination MAC address | Next-hop MAC address |
|---|---|---|
| 1 | MAC-A-2 | MAC-C-2 |

TABLE 8

Correspondence table of the multimode device C

| Destination IPv6 address | Destination physical interface | Next-hop physical interface | Routing metric (Metric) |
|---|---|---|---|
| ::/0 | MAC-A-1 | MAC-A-1 | 40 |
| ::/0 | MAC-A-2 | MAC-A-2 | 50 |

TABLE 8-1

Routing table of the multimode device C

| Index (Index) | Destination (Destination) | Next hop (NextHop) | Outbound interface (Interface) | Routing metric (Metric) | Protocol type (Protocol) |
|---|---|---|---|---|---|
| 1 | ::/0 | FE80::IID-MAC-A-1 | PLC | 30 | L2-PLC |
| 2 | ::/0 | FE80::IID-MAC-A-2 | RF | 40 | L2-RF |

TABLE 8-2

Neighbor table of the multimode device C

| Index (Index) | IP address | MAC address | Outbound interface (Interface) | Lifetime (Lifetime) |
|---|---|---|---|---|
| 1 | FE80::IID-MAC-A-1 | MAC-A-1 | PLC | Reachable |
| 2 | FE80::IID-MAC-A-2 | MAC-A-2 | RF | Reachable |

TABLE 8-3

PLC-link MAC forwarding table of the multimode device C

| Index | Destination MAC address | Next-hop MAC address |
|---|---|---|
| 1 | MAC-A-1 | MAC-A-1 |

TABLE 8-4

RF-link MAC forwarding table of the multimode device C

| Index (Index) | Destination MAC address | Next-hop MAC address |
|---|---|---|
| 1 | MAC-A-2 | MAC-C-2 |
| 2 | MAC-E-2 | MAC-E-2 |

For example, if the multimode device E needs to send a first packet (a source IPv6 address of the first packet is the IPv6 address of multimode device E, and a destination IPv6 address of the first packet is an IPv6 address of multimode device C) to the multimode device C, the multimode device E first obtains a next hop (FE80::IID-MAC-A-1) and an outbound interface (PLC) based on a routing table (Table 6-1); then queries a neighbor table (Table 6-2) based on the next hop to obtain a MAC address (MAC-A-1) of the next hop; queries a PLC-link MAC forwarding table (Table 6-3) based on the MAC address of the next hop to obtain a directly connected MAC address (MAC-B-1); sets a destination MAC address of the first packet to MAC-B-1, sets a source MAC address of the first packet to MAC-E-1, sets an original destination MAC of the first packet to MAC-A-1, and sets an original source MAC address of the first packet to MAC-E-1, to obtain a second packet; and sends the second packet through a PLC interface.

After receiving the second packet, the multimode device B queries a PLC-link MAC forwarding table (Table 7-3) of the multimode device B based on an original destination MAC address (MAC-A-1) of the second packet to obtain a directly connected MAC address (MAC-A-1); sets a destination MAC address of the second packet to MAC-A-1, sets a source MAC address of the second packet to MAC-B-1, sets an original destination MAC address of the second packet to MAC-A-1, and sets an original source MAC address of the second packet to MAC-E-1, to obtain a third packet; and sends the third packet through a PLC interface.

The gateway device A receives the third packet from the PLC interface (MAC-A-1); queries a routing table (Table 4-1) based on a destination IPv6 address of the third packet, that is, the IPv6 address of the multimode device C, to obtain a next hop (FE80:: IID-MAC-C-2) and an outbound interface (RF); queries a neighbor table (Table 4-2) based on the next hop to obtain a MAC address (MAC-C-2) of a next hop; queries an RF-link MAC forwarding table (Table 4-4) based on the MAC address of the next hop to obtain a directly connected MAC address (MAC-C-2); sets a destination MAC address of the third packet to MAC-C-2, sets a source MAC address of the third packet to MAC-A-2, sets an original destination MAC of the third packet to MAC-C-2, and sets an original source MAC address of the third packet to MAC-A-2, to obtain a fourth packet; and sends the fourth packet through an RF interface.

The multimode device C receives the fourth packet, determines that the multimode device C is a target communication device, and sends the fourth packet to an upper-layer application.

According to the technical solutions provided in this application, even though a PLC technology and an RF technology differ greatly in link layer protocols, networking algorithms, and rates, the PLC-RF hybrid network can still be established, to implement efficient communication.

Figure 5:
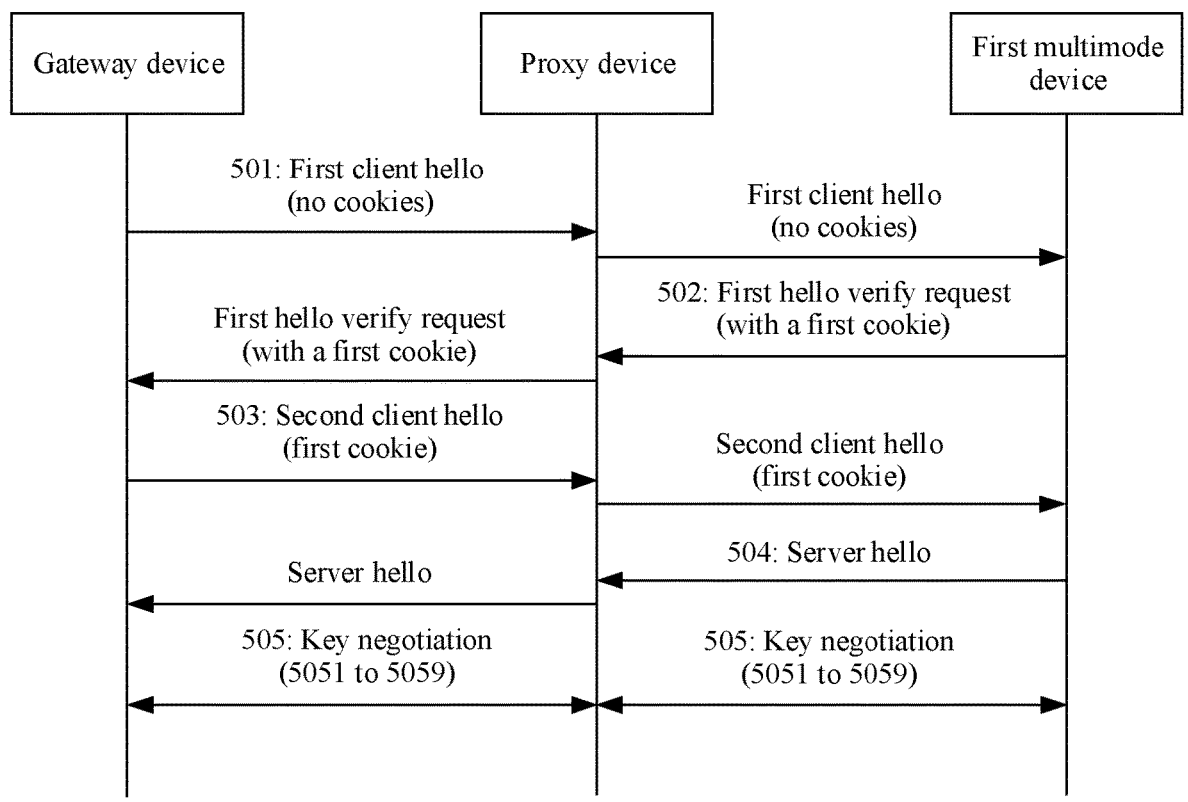
FIG. 5 is a flowchart of a security authentication procedure in a hybrid network according to an embodiment of this application.

Optionally, to improve network security, before step 403 shown in FIG. 4, security operations such as network access authentication and communication key negotiation may be further performed between the first multimode device and the gateway device. FIG. 5 is a flowchart of a security authentication procedure in a hybrid network according to an embodiment of this application. Before step 403, the gateway device A and the multimode device E perform DTLS handshake by performing steps 501 to 507, to implement network security authentication and key negotiation, and establish an encrypted channel. Steps 501 to 504 are a network security authentication process, and step 505 is a key negotiation process.

Step 501: A first multimode device sends, to a gateway device, a first client hello (ClientHello) packet carrying no cookie.

To defend against denial of service (DoS) attacks, a stateless cookie authentication mechanism is introduced in the DTLS.

The first client hello packet includes a protocol version number, a 32-byte random number, a session identifier (ID), and a cipher suite, a signature algorithm, and a compression mode that are supported by the first multimode device, and the like.

Step 502: The gateway device generates a first cookie, and sends a hello verify request (HelloVerifyRequest) packet including the first cookie to the first multimode device.

Checking can still be performed without a need to store states of all clients in the first cookie. The gateway device may generate the first cookie according to the following Formula (1):

$$\text{Cookie} = \text{HMAC}(\text{Secret}, \text{Client IP}, \text{Client Parameter}) \quad \text{Formula (1)}$$

HMAC ( ) is a hash-based integrity check algorithm. Secret is a random number, and may be used as a key and a generated cookie that are included in the hello verify request packet and is sent to a device. Client IP is an IP address of the client. Client Parameter may be set to different values based on settings, or may be optional.

Step 503: After receiving the hello verify request packet, the first multimode device sends a second client hello packet carrying the first cookie to the gateway device.

The gateway device may verify, based on the second client hello packet, whether an IP address of the first multimode device is trusted, to prevent DoS attacks.

The second client hello packet and the first client hello packet have same parameters.

Step 504: The gateway device receives the second client hello packet, and responds to the first multimode device by using a server hello (ServerHello) packet.

Optionally, the gateway device selects, based on the second client hello packet, a cipher suite (for example, ECC) and a compression mode that are supported by the first multimode device, and performs step 505 for negotiating a key with the first multimode device.

Step 505: The gateway device negotiates the key with the first multimode device, to perform the following steps 5050 to 5059.

Step 5050: The gateway device sends a first certificate packet, where the first certificate packet includes an elliptic curve digital signature algorithm (ECDSA)-signed first elliptic curve cryptography (ECC) certificate of the gateway device.

Step 5051: The first multimode device verifies a signature and validity of the first ECC certificate by using a static public key in the first ECC certificate, and then sends a second certificate packet, where the second certificate packet includes the ECDSA-signed first ECC certificate.

Step 5052: The gateway device sends an ECDSA-signed first server key exchange (ServerKeyExchange) packet, where the ECDSA-signed first server key exchange (ServerKeyExchange) packet includes several temporary elliptic curve Diffie-Hellman (ECDH) public keys and corresponding elliptic curve domain parameters.

For example, the first server key exchange packet includes a first temporary ECDH public key and a corresponding first elliptic curve field parameter, and further includes a second temporary ECDH public key and a corresponding second elliptic curve field parameter.

Step 5053: The first multimode device verifies a signature of the first server key exchange packet by using the static public key in the first ECC certificate, selects a temporary ECDH public key and a corresponding elliptic curve domain parameter from the first server key exchange packet, and sends a client key exchange packet to the gateway device.

Step 5054: The gateway device sends a first certificate request (CertificateRequest) packet, to request the first multimode device to provide an ECDSA-signed second ECC certificate.

Step 5055: The first multimode device performs an ECDSA digital signature on handshake messages such as a second client hello packet, the second certificate packet, and the client key exchange packet by using a private key of the first multimode device; and then sends a certificate verify (CertificateVerify) packet to the gateway device, where the certificate verify packet includes the ECDSA-signed second ECC certificate of the first multimode device.

Step 5056: The gateway device verifies a signature and validity of the second ECC certificate, verifies a signature of the certificate verify packet, and sends a server hello done (ServerHelloDone) packet to indicate that the gateway has sent all packets in a current phase.

Step 5057: The first multimode device generates a pre-master key by using the private key of the first multimode device and a temporary ECDH public key of the gateway device, and then calculates a 48-byte master key based on a 32-byte random number in the second client hello packet and a 32-byte random number in the server hello packet.

Step 5058: The first multimode device sends a change cipher specification (ChangeCipherSpec) packet, to indicate that subsequent packets sent by the first multimode device are encrypted by using the master key; and sends a finished packet that is encrypted by using the master key.

Step 5059: After receiving the finished packet, the gateway device calculates the master key in the same manner, and sends the change cipher specification packet and the finished packet to the first multimode device. By now, the entire DTLS handshake procedure ends.

After key negotiation is completed, a configuration message and a configuration response message that are sent by the gateway device to the first multimode device may be encrypted by using the master key obtained through negotiation for transmission. This improves network security. For authentication and key negotiation processes between the gateway device and a second multimode device, a third multimode device, and the like, refer to the foregoing steps 501 to 505.

It can be learned from FIG. 1 that there are two or more paths from the gateway device to each multimode device. Therefore, online statuses or link quality of all interfaces of devices may be monitored in real time, to update routing metrics or route states in a routing table. In this way, automatic switching of a layer-2 forwarding path can be implemented based on link quality. In an embodiment of this application, adjusting a routing metric is used as an example for description.

Figure 6:
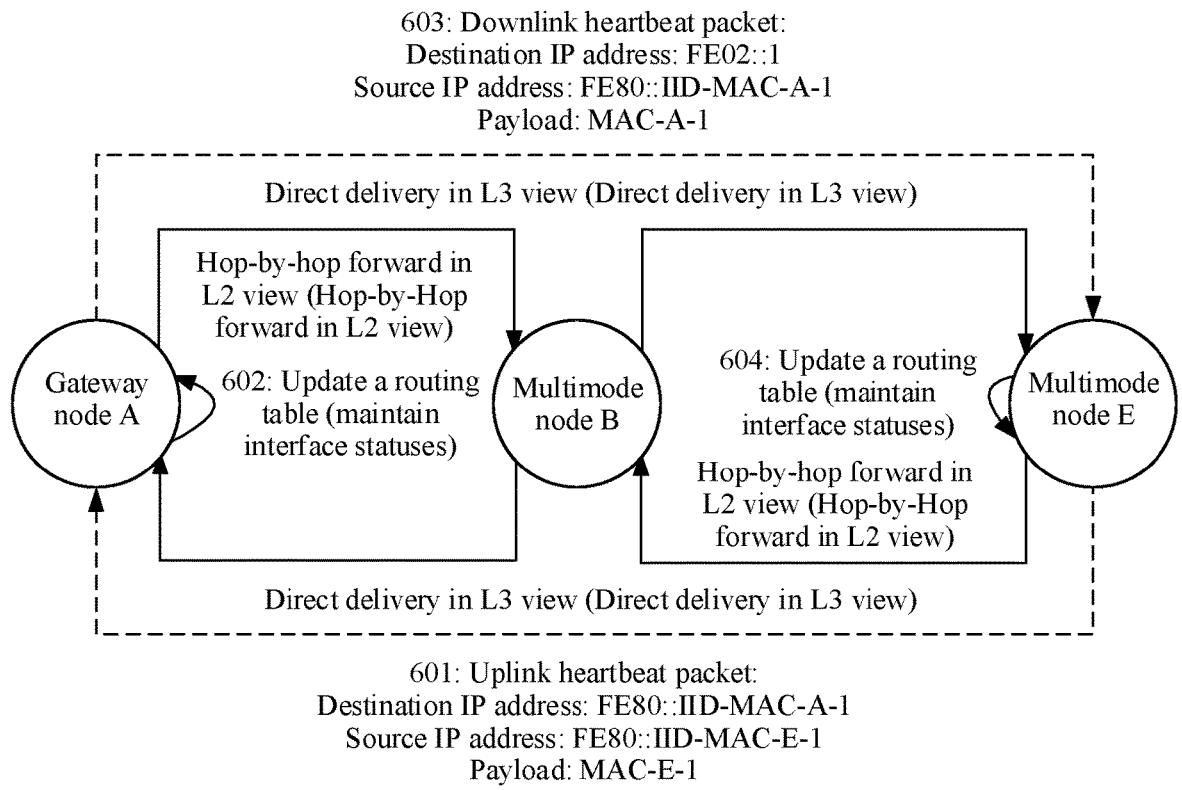
FIG. 6 is a flowchart of a routing updating method according to an embodiment of this application.

Refer to FIG. 6. An embodiment of this application provides a route update method. The method may be used for automatic switching of a link-layer forwarding path in a hybrid network (for example, the PLC-RF hybrid network shown in FIG. 1). In FIG. 6, update of a route between the gateway A and the multimode device E in the hybrid network shown in FIG. 1 is used as an example for description. For other nodes, refer to this embodiment. Refer to FIG. 6. The method includes the following steps.

Step 601: The multimode device E sends a first heartbeat packet through a PLC interface based on a heartbeat period.

The first heartbeat packet includes a MAC address of the PLC interface of the multimode device E.

In this embodiment of this application, a heartbeat packet may be a UDP packet. For a format of the heartbeat packet, refer to FIG. 7.

A source MAC address of the first heartbeat packet is a MAC address (MAC-E-1) of the PLC interface of the multimode device E, a destination MAC address of the first heartbeat packet is a MAC address (MAC-A-1) of a PLC interface of a gateway device, a source IPv6 address of the first heartbeat packet is an IPv6 link-local address (for example, FE80::IID-MAC-E-1) of the PLC interface, a destination IPv6 address of the first heartbeat packet is null or a device IPv6 address (2002::IID-A) of the gateway device or an IPv6 link-local address (FE80::IID-MAC-A-1) of the PLC interface of the gateway device, and a payload of the first heartbeat packet carries the MAC address (MAC-E-1) of the PLC interface of the multimode device E.

When the multimode device accesses a network, the heartbeat period may be delivered by the gateway device to each multimode device by using a configuration message. The heartbeat period may be carried in the configuration message described above.

If the multimode device accesses a network through a proxy, that is, there is a proxy device on a path from the multimode device to the gateway device, the first heartbeat packet is sent to the gateway device hop by hop. During forwarding of the first heartbeat packet hop by hop, a destination MAC address and a source MAC address both change hop by hop. The forwarding process is the same as the foregoing described forwarding process of the first packet. Details are not described herein again.

Each multimode device sends a heartbeat packet and maintain a status of each interface (link) on a per-interface basis. Therefore, the multimode device E further periodically sends a second heartbeat packet through an RF interface. In a MAC header of the second heartbeat packet, a source MAC address of the second heartbeat packet is a MAC address (MAC-E-2) of the RF interface of the multimode device E, and a destination MAC address of the second heartbeat packet is a MAC address (MAC-A-2) of an RF interface of the gateway device A; and in an IPv6 header of the second heartbeat packet, a source IPv6 address of the second heartbeat packet is an IPv6 link-local address (for example, FE80::IID-MAC-E-2) of the RF interface of the multimode device E, a destination IPv6 address of the second heartbeat packet is null or a device IPv6 address (2002::IID-A) of the gateway device or an IPv6 link-local address (FE80::IID-MAC-A-2) of the RF interface of the gateway device A, and a payload of the second heartbeat packet carries the MAC address (MAC-E-2) of the RF interface of the multimode device E.

Step 602: The gateway device updates a correspondence (for example, a routing table) based on the first heartbeat packet and an update rule.

In this embodiment of this application, the update rule may be set as follows: if a heartbeat is lost for more than first duration, adjusting a routing metric value of a corresponding routing entry in the routing table to a maximum value; if the heartbeat is lost for more second duration, deleting the corresponding routing entry in the routing table; or if the heartbeat is lost for more than the first duration, and the heartbeat resumes within the second duration, adjusting the routing metric value of the corresponding routing entry in the routing table to an original value.

The gateway device updates, based on the first heartbeat packet and the update rule, a routing entry corresponding to a first protocol interface in the routing table of the gateway device.

Similarly, the gateway device further updates, based on the second heartbeat packet and the update rule, a routing entry corresponding to a second protocol interface in the routing table of the gateway device.

For example, the first duration may be set to 5 heartbeat periods or 10 heartbeat periods, and the second duration may be set to 40 heartbeat periods or 50 heartbeat periods.

With reference to FIG. 1, if a heartbeat of the PLC interface of the device E is lost for the first duration (for example, five heartbeat periods), the gateway device A may adjust a metric value of a routing table (Table 4-1) in index 1 to a maximum value, for example, 150. In this way, packets sent from the device A to the device E are preferentially matched to a route corresponding to index 2. In other words, the packets are transmitted over an RF link. If the heartbeat of the PLC interface of the device E resumes within the second duration (for example, 40 heartbeat periods), the gateway device A may adjust the metric value of index 1 in the routing table (Table 4-1) back to 70. If the heartbeat loss of the PLC interface of the device E reaches the second duration, the gateway device A may delete the entry of index 1 from the routing table (Table 4-1).

The gateway device may maintain statuses of all protocol interfaces of all dual-mode devices by using an interface status table shown in Table 9. Certainly, Table 9 may alternatively be divided into two tables based on interface types, and one status table corresponds to one protocol type of interfaces. Specific implementation is not limited in this application.

TABLE 9

Interface status table

| Device identifier | Interface type | Interface status | Trigger condition | Trigger action |
| --- | --- | --- | --- | --- |
| 2002::IID-B | PLC | Online to offline (Online to Offline) | A heartbeat of the interface is lost for the first duration. | Change a metric value of a routing entry to a maximum value. |
| 2002::IID-B | RF | Online (Online) | An interface accesses a network or a heartbeat is received from the interface. | Add/Maintain a routing entry. |
| 2002::IID-C | PLC | Online (Online) | An interface accesses a network or a heartbeat is received from the interface. | Add/Maintain a routing entry. |
| 2002::IID-C | RF | Offline to online (Offline to Online) | A heartbeat of the interface resumes in the second duration after being lost. | Change a metric value of a routing entry to an original value. |

TABLE 9-continued

Interface status table

| Device identifier | Interface type | Interface status | Trigger condition | Trigger action |
|---|---|---|---|---|
| 2002::IID-E | PLC | Disconnect (Disconnect) | A heartbeat of the interface is lost for more than the second duration. | Delete a routing entry. |
| 2002::IID-E | RF | Offline to online (Offline to Online) | A heartbeat of the interface resumes in the second duration after being lost. | Change a metric value of a routing entry to an original value. |

Certainly, during implementation, an interface status may be alternatively maintained in other manners, in addition to by using the status table. This is not limited in this application.

Step 603: The gateway device broadcasts a third heartbeat packet through the PLC interface based on the heartbeat period.

The third heartbeat packet includes the MAC address of the PLC interface of the gateway device.

A source MAC address of the third heartbeat packet is the MAC address (MAC-A-1) of the PLC interface of the gateway device, a destination MAC address of the third heartbeat packet is a MAC broadcast address (for example, FFFF:FFFF:FFFF), a source IPv6 address of the third heartbeat packet is the IPv6 link-local address (FE80::IID-MAC-A-1) of the PLC interface of the gateway device, a destination IPv6 address of the third heartbeat packet is an IPv6 broadcast address (for example, FF02::1), and a payload of the third heartbeat packet carries the MAC address (MAC-A-1) of the PLC interface of the gateway device.

The third heartbeat packet is broadcast through the PLC interface of the gateway device, and then broadcast to the entire network according to a link layer mechanism.

The gateway device also sends a heartbeat packet and maintain a status of each interface (link) on a per-interface basis. Therefore, the gateway device further periodically broadcasts a fourth heartbeat packet through an RF interface. A source MAC address of the fourth heartbeat packet is the MAC address (MAC-A-2) of the RF interface of the gateway device, a destination MAC address of the fourth heartbeat packet is the MAC broadcast address, a source IPv6 address of the fourth heartbeat packet is the IPv6 link-local address (FE80::IID-MAC-A-2) of the RF interface of the gateway device, a destination IPv6 address of the fourth heartbeat packet is the IPv6 broadcast address (for example, FF02::1), and a payload of the fourth heartbeat packet carries the MAC address (MAC-A-2) of the RF interface of the gateway device.

The fourth heartbeat packet is broadcast through the RF interface of the gateway device, and then broadcast to the entire network according to the link layer mechanism.

Step 604: The multimode device E updates a default gateway correspondence (for example, the routing table) based on the third heartbeat packet and the update rule.

After the third heartbeat packet is broadcast, all multimode devices in the entire network receive the heartbeat packet. The multimode device E in FIG. 6 is used as an example.

The multimode device E updates, based on the third heartbeat packet and the update rule, a routing entry corresponding to the PLC interface in the routing table of the multimode device E.

Similarly, the multimode device E further updates, based on the fourth heartbeat packet and the update rule, a routing entry corresponding to the RF interface in the routing table of the multimode device E.

With reference to FIG. 1, if the PLC interface of the device E does not receive a heartbeat packet of the gateway device A for the first duration (for example, five heartbeat periods), the device E may adjust a metric value of index 1 in a routing table (Table 6-1) to a maximum value, for example, 150. In this way, packets sent from the device E to the device A are preferentially matched to a route corresponding to index 2. In other words, the packets are transmitted over an RF link. If the PLC interface of the device E resumes to receive a heartbeat packet of the gateway A within the second duration (for example, 40 heartbeat periods), the device E may adjust the metric value of index 1 in the routing table (Table 6-1) back to 70. If the PLC interface of the device E does not receive a heartbeat packet of the gateway device A for the second duration, the device E may delete the entry of index 1 from the routing table (Table 6-1).

If a protocol interface of the multimode device has a link layer heartbeat, a link state may be maintained and a routing table may be updated only based on the link layer heartbeat, or based on the route update method shown in FIG. 6 in combination with the link layer heartbeat.

Each multimode device may alternatively maintain an interface status of the gateway device by using the status table as shown in Table 9 or directly by using a form such as a register or an array to indicate different statuses of the gateway interface by setting different values.

Similarly, a second multimode device, a third multimode device, and the like in the hybrid network may maintain a link state by performing steps 601 to 604, to implement dynamic route updating.

Figure 8:
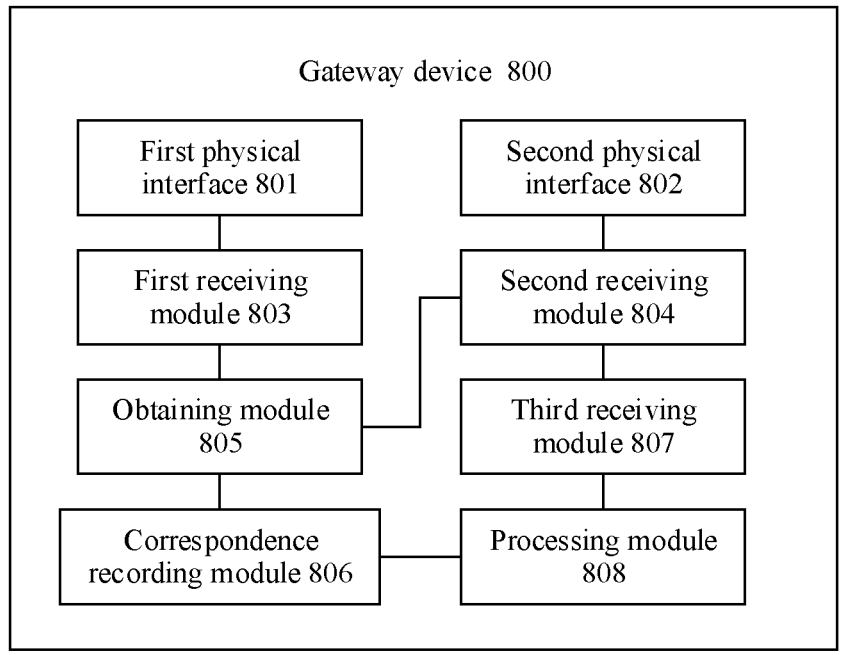
FIG. 8 is a diagram of a gateway device according to an embodiment of this application.

FIG. 8 shows a gateway device 800. The gateway device includes a first physical interface 801 and a second physical interface 802. The gateway device 800 supports a first communication protocol and a second communication protocol. A protocol type used by the first physical interface 801 is the first communication protocol. A protocol type used by the second physical interface 802 is the second communication protocol.

The gateway device 800 further includes:

a first receiving module 803, configured to receive a first association request of a multimode device through the first physical interface 801, where the first association request includes a MAC address of a third physical interface, the third physical interface is a physical interface of the multimode device, and a protocol type used by the third physical interface is the first communication protocol;

a second receiving module 804, configured to receive a second association request of the multimode device through the second physical interface 802, where the second association request includes a MAC address of a fourth physical interface, the fourth physical interface is a physical interface of the multimode device, and a protocol type used by the fourth physical interface is the second communication protocol;

an obtaining module 805, configured to obtain an IPv6 address of the multimode device;

a correspondence recording module 806, configured to record a first correspondence and a second correspondence based on the IPv6 address of the multimode device obtained by the obtaining module 805, where the first correspondence includes a correspondence among the IPv6 address of the multimode device, the MAC address of the third physical interface, and the first physical interface 801; and the second correspondence includes a correspondence among the IPv6 address of the multimode device, the MAC address of the fourth physical interface, and the second physical interface 802;

a third receiving module 807, configured to receive a first packet whose destination IP address is the IPv6 address of the multimode device; and a processing module 808, configured to: set a destination MAC address of the first packet to a MAC address of the third physical interface based on the first correspondence, to obtain a second packet, and send the second packet through the first physical interface 801; or set a destination MAC address of the first packet to the MAC address of the fourth physical interface based on the second correspondence, to obtain a third packet, and send the third packet through the second physical interface 802.

Optionally, the gateway device 800 further includes a first sending module and a second sending module.

The first sending module is configured to send a first notification to the multimode device through the first physical interface, where the first notification includes a MAC address of the first physical interface. Correspondingly, the first receiving module 803 is further configured to receive a fourth packet through the first physical interface 801, where a destination MAC address of the fourth packet is the MAC address of the first physical interface 801, a source MAC address of the fourth packet is the MAC address of the third physical interface, and a destination IP address of the fourth packet is a source IP address of the first packet.

The second sending module is configured to send a second notification to the multimode device through the third physical interface, where the second notification includes a MAC address of the second physical interface. The second receiving module 804 is further configured to receive a fifth packet through the second physical interface 802, where a destination MAC address of the fifth packet is the MAC address of the second physical interface 802, a source MAC address of the fifth packet is the MAC address of the fourth physical interface, and a destination IP address of the fifth packet is the source IP address of the first packet.

The obtaining module 805 is configured to receive an address advertisement message sent by the multimode device, where the address advertisement message includes the MAC address of the third physical interface, the MAC address of the fourth physical interface, and the IPv6 address of the multimode device.

Optionally, the gateway device 800 further includes a third sending module, configured to: before the third receiving module 807 receives the address advertisement message sent by the multimode device, send a configuration message to the multimode device, where the configuration message includes an IPv6 address prefix, and the IPv6 address in the address advertisement message includes the IPv6 address prefix.

Optionally, the configuration message further includes a link-layer key. The gateway device 800 further includes an authentication and encryption module, configured to perform network access authentication on the multimode device, and negotiate with the multimode device to generate a master key. The authentication and encryption module is configured to execute the actions on the gateway device side in the procedure shown in FIG. 5.

The gateway device 800 further includes: a fourth sending module and a fifth sending module. The fourth sending module is configured to broadcast a first heartbeat message, where a source MAC address of the first heartbeat message is the MAC address of the first physical interface, a destination MAC address of the first heartbeat message is a MAC broadcast address, a destination IPv6 address of the first heartbeat message is an IPv6 broadcast address, and a payload of the first heartbeat message carries the MAC address of the first physical interface. The fifth sending module is configured to broadcast a second heartbeat message, where a source MAC address of the second heartbeat message is the MAC address of the third physical interface, a destination MAC address of the second heartbeat message is a MAC broadcast address, a destination IPv6 address of the second heartbeat message is an IPv6 broadcast address, and a payload of the second heartbeat message carries the MAC address of the third physical interface.

For details about the modules in the gateway device 800 that are not described, refer to descriptions in the methods shown in FIG. 2, FIG. 4, and FIG. 5. Details are not described herein again.

Figure 9:
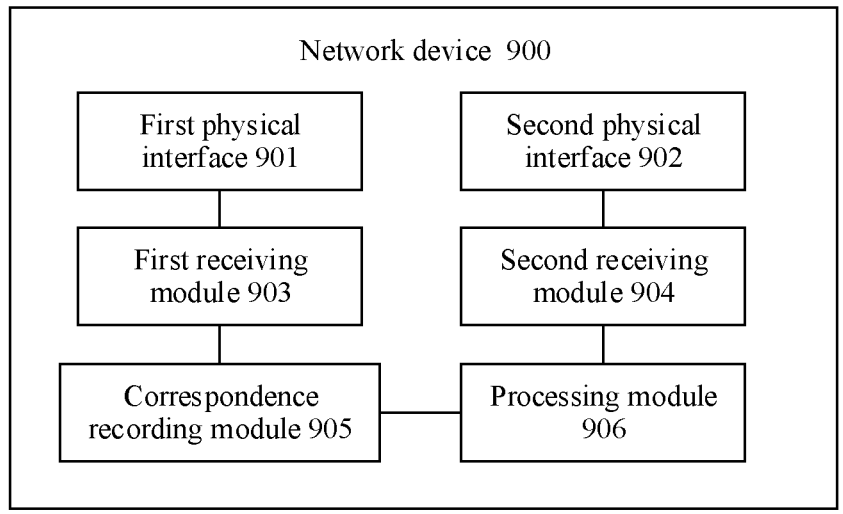
FIG. 9 is a diagram of a network device according to an embodiment of this application.

FIG. 9 shows a network device 900 according to an embodiment of this application. The network device 900 includes a first physical interface 901 and a second physical interface 902. The network device supports a first communication protocol and a second communication protocol, and is used in a hybrid network supporting the first communication protocol and the second communication protocol. A protocol type used by the first physical interface 901 is the first communication protocol, and a protocol type used by the second physical interface 902 is the second communication protocol.

The network device 900 further includes:

a first receiving module 903, configured to receive a first notification from a gateway device through the first physical interface 901, where the first notification includes a MAC address of a third physical interface, the third physical interface is a physical interface of the gateway device, and a protocol type used by the third physical interface is the first communication protocol;

a second receiving module 904, configured to receive a second notification from the gateway device through the second physical interface 902, where the second notification includes a MAC address of a fourth physical interface, the fourth physical interface is a physical interface of the gateway device, and a protocol type used by the fourth physical interface is the second communication protocol;

a correspondence recording module 905, configured to record a first default gateway correspondence and a second default gateway correspondence, where the first default gateway correspondence includes a correspondence among a default IP address, the MAC address of the third physical interface, and the first physical interface 901; and the second default gateway correspondence includes a correspondence among the default IP address, the MAC address of the fourth physical interface, and the second physical interface 902; and a processing module 906, configured to: when a first packet is sent, set a destination MAC address of the first packet to the MAC address of the third physical interface based on the first default gateway correspondence, to obtain a second packet, and send the second packet through the first physical interface 901; or set a destination MAC address of the first packet to the MAC address of the fourth physical interface based on the second default gateway correspondence, to obtain a third packet, and send the third packet through the second physical interface 902.

The network device 900 further includes:

a first sending module, configured to send a first association request through the first physical interface 901, where the first association request includes a MAC address of the first physical interface; and a second sending module, configured to send a second association request through the second physical interface 902, where the second association request includes a MAC address of the second physical interface.

Optionally, the network device 900 further includes a third sending module, configured to send an address advertisement message to the gateway device, where the address advertisement message includes the MAC address of the first physical interface 901, the MAC address of the second physical interface 902, and an IPv6 address of the network device.

Optionally, the network device 900 further includes a third receiving module, configured to: before sending the address advertisement message to the gateway device, receive a configuration message sent by the gateway device, where the configuration message includes an IPv6 address prefix, and the IPv6 address in the address advertisement message includes the IPv6 address prefix.

Optionally, the configuration message further includes a link-layer key. The network device 900 further includes an authentication and encryption module, configured to perform network access authentication on the gateway device, and negotiate a master key. The address advertisement message sent by the third sending module may be encrypted by using the master key.

The processing module is further configured to: process a fourth packet when the first physical interface 901 receives the fourth packet, where a destination IP address of the fourth packet is the IPv6 address of the network device, and a destination MAC address of the fourth packet is the MAC address of the first physical interface; and process a fifth packet when the second physical interface 902 receives the fifth packet, where a destination IP address of the fifth packet is the IPv6 address of the network device, and a destination MAC address of the fifth packet is the MAC address of the third physical interface.

Optionally, the first sending module is further configured to send a first heartbeat message, where a source MAC address of the first heartbeat message is the MAC address of the first physical interface 901, a destination MAC address of the first heartbeat message is the MAC address of the third physical interface, and a payload of the first heartbeat message carries the MAC address of the first physical interface. The second sending module further sends a second heartbeat message, where a source MAC address of the second heartbeat message is the MAC address of the second physical interface 902, a destination MAC address of the second heartbeat message is the MAC address of the fourth physical interface, and a payload of the second heartbeat message carries the MAC address of the third physical interface.

For details about the modules in the network device 900 that are not described, refer to descriptions in the methods shown in FIG. 2, FIG. 4, and FIG. 5. Details are not described herein again.

Figure 10:
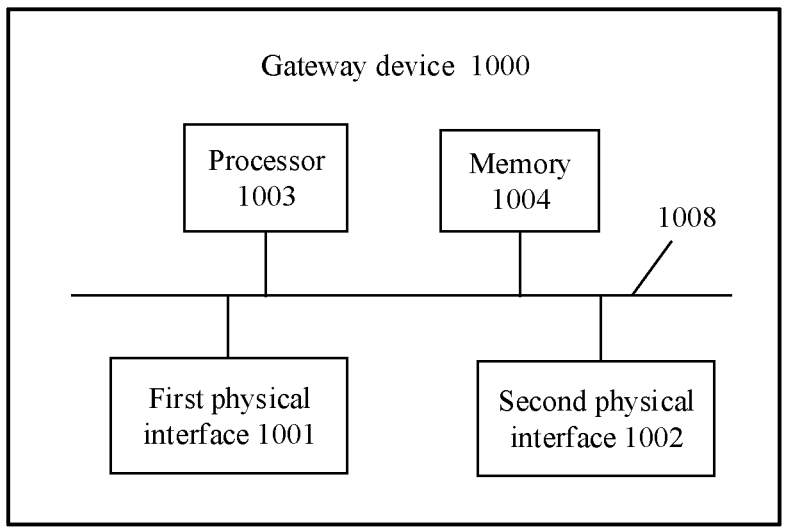
FIG. 10 is a diagram depicting a gateway device according to an embodiment of this application.

Refer to FIG. 10. An embodiment of this application provides a gateway device 1000, including a first physical interface 1001, a second physical interface 1002, a processor 1003, and a memory 1004, coupled to a bus 1008. The gateway device 1000 supports a first communication protocol and a second communication protocol. A protocol type used by the first physical interface 1001 is the first communication protocol. A protocol type used by the second physical interface 1002 is the second communication protocol. For example, the first physical interface 1001 is a PLC interface, and the second physical interface 1002 is an RF interface.

The processor 1003 is configured to perform the following operations:

receiving a first association request of a multimode device through the first physical interface 1001, where the first association request includes a MAC address of a third physical interface, the third physical interface is a physical interface of the multimode device, and a protocol type used by the third physical interface is the first communication protocol;

receiving a second association request of the multimode device through the second physical interface 1002, where the second association request includes a MAC address of a fourth physical interface, the fourth physical interface is a physical interface of the multimode device, and a protocol type used by the fourth physical interface is the second communication protocol;

obtaining an IPv6 address of the multimode device;

recording a first correspondence and a second correspondence based on the obtained IPv6 address of the multimode device, where the first correspondence includes a correspondence among the IPv6 address of the multimode device, the MAC address of the third physical interface, and the first physical interface 1001; and the second correspondence includes a correspondence among the IPv6 address of the multimode device, the MAC address of the fourth physical interface, and the second physical interface 1002;

receiving a first packet whose destination IP address is the IPv6 address of the multimode device; and setting a destination MAC address of the first packet to a MAC address of the third physical interface based on the first correspondence, to obtain a second packet, and sending the second packet through the first physical interface 1001; or setting a destination MAC address of the first packet to the MAC address of the fourth physical interface based on the second correspondence, to obtain a third packet, and sending the third packet through the second physical interface 1002.

The memory 1004 is configured to store the first correspondence and the second correspondence.

Optionally, the processor 1003 is further configured to perform the following operation:

sending a first notification to the multimode device through the first physical interface, where the first notification includes a MAC address of the first physical interface; receiving a fourth packet through the first physical interface 1001, where a destination MAC address of the fourth packet is the MAC address of the first physical interface 1001, a source MAC address of the fourth packet is the MAC address of the third physical interface, and a destination IP address of the fourth packet is a source IP address of the first packet.

Optionally, the processor 1003 is further configured to perform the following operation:

sending a second notification to the multimode device through the second physical interface, where the second notification includes a MAC address of the second physical interface; receiving a fifth packet through the second physical interface 1002, where a destination MAC address of the fifth packet is MAC address of the second physical interface 1002, a source MAC address of the fifth packet is the MAC address of the fourth physical interface, and a destination IP address of the fifth packet is a source IP address of the first packet.

Optionally, the processor 1003 is configured to perform the following operation: receiving an address advertisement message sent by the multimode device, where the address advertisement message includes the MAC address of the third physical interface, the MAC address of the fourth physical interface, and the IPv6 address of the multimode device.

Optionally, the processor 1003 is further configured to perform the following operation: before the address advertisement message sent by the multimode device is received, sending a configuration message to the multimode device, where the configuration message includes an IPv6 address prefix, and the IPv6 address in the address advertisement message includes the IPv6 address prefix.

Optionally, the configuration message further includes a link-layer key. The processor 1003 is further configured to perform the following operations: performing network access authentication on the multimode device, and negotiating with the multimode device to generate a master key. The processor 1003 is configured to execute the actions on the gateway device side in the procedure shown in FIG. 5.

Optionally, the processor 1003 is further configured to perform the following operations:

broadcasting a first heartbeat message, where a source MAC address of the first heartbeat message is the MAC address of the first physical interface, a destination MAC address of the first heartbeat message is a MAC broadcast address, a destination IPv6 address of the first heartbeat message is an IPv6 broadcast address, and a payload of the first heartbeat message carries the MAC address of the first physical interface; and broadcasting a second heartbeat message, where a source MAC address of the second heartbeat message is the MAC address of the second physical interface, a destination MAC address of the second heartbeat message is a MAC broadcast address, a destination IPv6 address of the second heartbeat message is an IPv6 broadcast address, and a payload of the second heartbeat message carries the MAC address of the second physical interface.

The processor 1003 may be a central processing unit (CPU), a network processor (CP), or a combination of a CPU and an NP.

The processor 1003 may further include a hardware chip. The hardware chip may be an ASIC, a PLD, or a combination thereof. The PLD may be a CPLD, an FPGA, a GAL, or any combination thereof.

Optionally, the memory 1004 may be further configured to store computer program instructions. The processor 1003 executes the instructions stored in the memory 1004, to implement the steps performed by the gateway device in FIG. 2, FIG. 4, and FIG. 5. Communication between the processor 1003 and the memory 1004 may be implemented through a bus.

The memory 1004 may include a volatile memory such as a RAM, or may include a nonvolatile memory such as a flash memory, an HDD, or an SSD. The memory 1004 may alternatively include a combination of the foregoing types of memories.

For details about the gateway device 1000 that are not described, refer to descriptions in the methods shown in FIG. 2, FIG. 4, and FIG. 5. Details are not described herein again.

Figure 11:
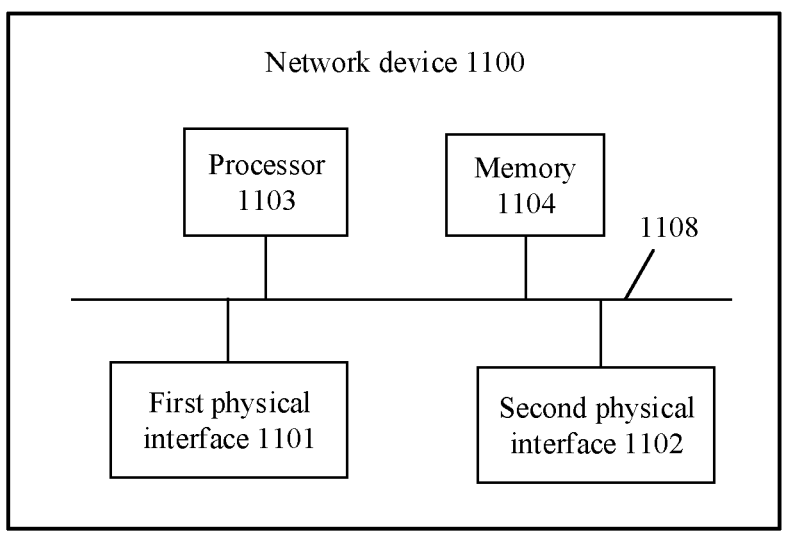
FIG. 11 is a diagram depicting a network device according to an embodiment of this application.

Refer to FIG. 11. An embodiment of this application provides a network device 1100, including a first physical interface 1101, a second physical interface 1102, a processor 1103, and a memory 1104, coupled to a bus 1108. The network device 1100 supports a first communication protocol and a second communication protocol, and is used in a hybrid network supporting the first communication protocol and the second communication protocol. A protocol type used by the first physical interface 1101 is the first communication protocol, and a protocol type used by the second physical interface 1102 is the second communication protocol. For example, the first physical interface 1101 is a PLC interface, and the second physical interface 1102 is an RF interface.

The processor 1103 is configured to perform the following operations:

receiving a first notification from a gateway device through the first physical interface 1101, where the first notification includes a MAC address of a third physical interface, the third physical interface is a physical interface of the gateway device, and a protocol type used by the third physical interface is the first communication protocol;

receiving a second notification from the gateway device through the second physical interface 1102, where the second notification includes a MAC address of a fourth physical interface, the fourth physical interface is a physical interface of the gateway device, and a protocol type used by the fourth physical interface is the second communication protocol;

recording a first default gateway correspondence and a second default gateway correspondence, where the first default gateway correspondence includes a correspondence among a default IP address, the MAC address of the third physical interface, and the first physical interface 1101; and the second default gateway correspondence includes a correspondence among the default IP address, the MAC address of the fourth physical interface, and the second physical interface 1102; and when a first packet is sent, setting a destination MAC address of the first packet to the MAC address of the third physical interface based on the first default gateway correspondence, to obtain a second packet, and sending the second packet through the first physical interface 1101; or setting a destination MAC address of the first packet to the MAC address of the fourth physical interface based on the second default gateway correspondence, to obtain a third packet, and sending the third packet through the second physical interface 1102.

The memory 1104 is configured to store the first default gateway correspondence and the second default gateway correspondence.

Optionally, the processor 1103 is further configured to perform the following operations:

sending a first association request through the first physical interface 1101, where the first association request includes a MAC address of the first physical interface; and sending a second association request through the second physical interface 1102, where the second association request includes a MAC address of the second physical interface.

Optionally, the processor 1103 is further configured to send an address advertisement message to the gateway device, where the address advertisement message includes the MAC address of the first physical interface 1101, the MAC address of the second physical interface 1102, and an IPv6 address of the network device.

Optionally, before sending the address advertisement message to the gateway device, the processor 1103 is further configured to receive a configuration message sent by the gateway device, where the configuration message includes an IPv6 address prefix, and the IPv6 address in the address advertisement message includes the IPv6 address prefix.

Optionally, the configuration message further includes a link-layer key. The processor 1103 is further configured to perform network access authentication on the gateway device, and negotiate a master key. The configuration message and the address advertisement message may be encrypted by using the master key.

The processor 1103 is further configured to: process a fourth packet when the first physical interface 1101 receives the fourth packet, where a destination IP address of the fourth packet is the IPv6 address of the network device, and a destination MAC address of the fourth packet is the MAC address of the first physical interface; and process a fifth packet when the second physical interface 1102 receives the fifth packet, where a destination IP address of the fifth packet is the IPv6 address of the network device, and a destination MAC address of the fifth packet is the MAC address of the second physical interface.

Optionally, the processor 1103 is further configured to: send a first heartbeat message, where a source MAC address of the first heartbeat message is the MAC address of the first physical interface 1101, a destination MAC address of the first heartbeat message is the MAC address of the third physical interface, and a payload of the first heartbeat message carries the MAC address of the first physical interface; and send a second heartbeat message, where a source MAC address of the second heartbeat message is the MAC address of the second physical interface 1102, a destination MAC address of the second heartbeat message is the MAC address of the fourth physical interface, and a payload of the second heartbeat message carries the MAC address of the second physical interface.

The processor 1103 may be a central processing unit (CPU), a network processor (CP), or a combination of a CPU and an NP.

The processor 1103 may further include a hardware chip. The hardware chip may be an ASIC, a PLD, or a combination thereof. The PLD may be a CPLD, an FPGA, a GAL, or any combination thereof.

Optionally, the memory 1104 may be further configured to store computer program instructions. The processor 1103 executes the instructions stored in the memory 1104, to implement the steps performed by the gateway device in FIG. 2, FIG. 4, and FIG. 5. Communication between the processor 1103 and the memory 1104 may be implemented through a bus.

The memory 1104 may include a volatile memory such as a RAM, or may include a nonvolatile memory such as a flash memory, an HDD, or an SSD. The memory 1104 may alternatively include a combination of the foregoing types of memories.

For details about the modules in the network device 1100 that are not described, refer to descriptions in the methods shown in FIG. 2, FIG. 4, and FIG. 5. Details are not described herein again.

An embodiment of this application provides a communication system, to implement a hybrid network. The communication system includes the gateway device shown in FIG. 8 or FIG. 10, and further includes the network device shown in FIG. 9 or FIG. 11.

An embodiment of this application further provides a computer-readable storage medium. The computer-readable storage medium stores instructions. When the instructions are run on a computer, the computer is enabled to perform the steps performed by the gateway device in the foregoing hybrid network communication method.

An embodiment of this application further provides a computer program product including instructions. When a computer runs the instructions in the computer program product, the computer performs the steps performed by the gateway device in the foregoing hybrid network communication method.

An embodiment of this application further provides a computer-readable storage medium. The computer-readable storage medium stores instructions. When the instructions are run on a computer, the computer is enabled to perform steps performed by the network device (a multimode device) in the foregoing hybrid network communication method.

An embodiment of this application further provides a computer program product including instructions. When a computer runs the instructions in the computer program product, the computer performs the steps performed by the network device (a multimode device) in the foregoing hybrid network communication method.

All or some of the devices provided in the embodiments of this application may be implemented by using software, hardware, firmware, or any combination thereof. When software is used to implement the methods, all or some of the methods may be implemented in a form of a computer program product. The computer program product includes one or more computer instructions. When the computer instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible to the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, an SSD), or the like.

It should further be understood that "first", "second", "third", "fourth", and various numbers in this specification are merely used for differentiation for ease of description, and are not construed as any limitation on the scope of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean an execution sequence in the embodiments of this application. The execution sequence of the processes should be determined based on functions and internal logic of the processes, and should not be construed as any limitation on the implementation processes of the embodiments of this application. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

The system, apparatus, and method disclosed in the embodiments of this application may be implemented in other manners. For example, the described apparatuses are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or partially contribute to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, or an optical disc.

The foregoing descriptions are merely embodiments of this application, but are not intended to limit this application. Any modification, equivalent replacement, or improvement made without departing from the principle of this application should fall within the protection scope of this application.

What is claimed is:

1. A hybrid network communication method, the method comprising:

receiving, by a gateway device, a first association request of a first multimode device through a first physical interface, the first association request comprising a MAC address of a second physical interface, the first multimode device supporting a first communication protocol and a second communication protocol, the first physical interface being a physical interface of the gateway device, the second physical interface being a physical interface of the first multimode device, and a protocol type used by the first physical interface and the second physical interface comprising the first communication protocol;

receiving, by the gateway device, a second association request of the first multimode device through a third physical interface, the second association request comprising a MAC address of a fourth physical interface, the third physical interface being a physical interface of the gateway device, the fourth physical interface being a physical interface of the first multimode device, and a protocol type used by the third physical interface and the fourth physical interface comprising the second communication protocol;

obtaining, by the gateway device, an Internet Protocol version 6 (IPv6) address of the first multimode device; and recording, by the gateway device, a first correspondence and a second correspondence, the first correspondence comprising a correspondence among the IPv6 address of the first multimode device, the MAC address of the second physical interface, and the first physical interface, and the second correspondence comprises a correspondence among the IPv6 address of the first multimode device, the MAC address of the fourth physical interface, and the third physical interface.

2. The method according to claim 1, wherein the method further comprises:

receiving, by the gateway device, a first packet with a destination IP address comprising the IPv6 address of the first multimode device; and setting, by the gateway device, a destination MAC address of the first packet to the MAC address of the second physical interface based on the first correspondence, to obtain a second packet, and sending the second packet through the first physical interface; or setting, by the gateway device, a destination MAC address of the first packet to the MAC address of the fourth physical interface based on the second correspondence, to obtain a third packet, and sending the third packet through the third physical interface.

3. The method according to claim 1, wherein the method further comprises: sending, by the gateway device, a first notification to the first multimode device through the first physical interface, wherein the first notification comprises a MAC address of the first physical interface.

4. The method according to claim 3, wherein the method further comprises: receiving, by the gateway device, a fourth packet through the first physical interface, wherein a destination MAC address of the fourth packet is the MAC address of the first physical interface, a source MAC address of the fourth packet is the MAC address of the second physical interface, and a destination IP address of the fourth packet is a source IP address of the first packet.

5. The method according to a claim 1, wherein the method further comprises: sending, by the gateway device, a second notification to the first multimode device through the third physical interface, wherein the second notification comprises a MAC address of the third physical interface.

6. The method according to claim 5, wherein the method further comprises: receiving, by the gateway device, a fifth packet through the third physical interface, wherein a destination MAC address of the fifth packet is the MAC address of the third physical interface, a source MAC address of the fifth packet is the MAC address of the fourth physical interface, and a destination IP address of the fifth packet is the source IP address of the first packet.

7. The method according to claim 1, wherein the obtaining, by the gateway device, an IPv6 address of the first multimode device comprises:
receiving, by the gateway device, an address advertisement message sent by the first multimode device, wherein the address advertisement message comprises the MAC address of the second physical interface, the MAC address of the fourth physical interface, and the IPv6 address of the first multimode device.

8. A hybrid network communication method, the method comprising:
receiving, by a multimode device supporting a first communication protocol and a second communication protocol, a first notification from a gateway device through a first physical interface, the first notification comprising a MAC address of a second physical interface, the first physical interface is a physical interface of the multimode device, the second physical interface is a physical interface of the gateway device, and a protocol type used by the first physical interface and the second physical interface is the first communication protocol;
receiving, by the multimode device, a second notification from the gateway device through a third physical interface, the second notification comprising a MAC address of a fourth physical interface, the third physical interface being a physical interface of the multimode device, the fourth physical interface being a physical interface of the gateway device, and a protocol type used by the third physical interface and the fourth physical interface comprising the second communication protocol;
recording, by the multimode device, a first default gateway correspondence and a second default gateway correspondence, the first default gateway correspondence comprising a correspondence among a default IP address, the MAC address of the second physical interface, and the first physical interface; and the second default gateway correspondence comprising a correspondence among the default IP address, the MAC address of the fourth physical interface, and the third physical interface; and
when sending a first packet, setting, by the multimode device, a destination MAC address of the first packet to the MAC address of the second physical interface based on the first default gateway correspondence to obtain a second packet, and sending the second packet through the first physical interface; or setting, by the multimode device, a destination MAC address of the first packet to the MAC address of the fourth physical interface based on the second default gateway correspondence to obtain a third packet, and sending the third packet through the third physical interface.

9. The method according to claim 8, wherein the method further comprises:
sending, by the multimode device, a first association request through the first physical interface, wherein the first association request comprises a MAC address of the first physical interface; and
sending, by the multimode device, a second association request through the third physical interface, wherein the second association request comprises a MAC address of the third physical interface.

10. The method according to claim 8, wherein the method further comprises:
sending, by the multimode device, an address advertisement message to the gateway device, wherein the address advertisement message comprises the MAC address of the first physical interface, the MAC address of the third physical interface, and an IPv6 address of the multimode device.

11. The method according to claim 10, wherein before the sending, by the multimode device, an address advertisement message to the gateway device, the method further comprises:
receiving, by the multimode device, a configuration message sent by the gateway device, wherein the configuration message comprises an IPv6 address prefix, and the IPv6 address in the address advertisement message comprises the IPv6 address prefix.

12. The method according to claim 8, wherein the method further comprises:
if the first physical interface of the multimode device receives a fourth packet, processing, by the multimode device, the fourth packet, wherein a destination IP address of the fourth packet is the IPv6 address of the multimode device, and a destination MAC address of the fourth packet is the MAC address of the first physical interface; and
if the third physical interface of the multimode device receives a fifth packet, processing, by the multimode device, the fifth packet, wherein a destination IP address of the fifth packet is the IPv6 address of the multimode device, and a destination MAC address of the fifth packet is the MAC address of the third physical interface.

13. The method according to claim 8, wherein the method further comprises:
performing, by the gateway device, network access authentication on the multimode device, and generating a master key through negotiation.

14. The method according to claim 8, wherein the method further comprises:
sending, by the multimode device, a first heartbeat message, wherein a source MAC address of the first heartbeat message is the MAC address of the first physical interface, a destination MAC address of the first heartbeat message is the MAC address of the second physical interface, and a payload of the first heartbeat message carries the MAC address of the first physical interface; and
sending, by the multimode device, a second heartbeat message, wherein a source MAC address of the second heartbeat message is the MAC address of the third physical interface, a destination MAC address of the second heartbeat message is the MAC address of the fourth physical interface, and a payload of the second heartbeat message carries the MAC address of the third physical interface.

15. A gateway device used in a hybrid network, the gateway device comprising:
a first physical interface, the first physical interface using a first communication protocol; and
a second physical interface, the second physical interface using a second communication protocol; and
the gateway device being configured to:
receive a first association request of a multimode device through the first physical interface, the first association request comprising a MAC address of a third physical interface, the multimode device supports the first communication protocol and the second communication protocol, the third physical interface is a physical interface of the multimode device, and a protocol type used by the third physical interface is the first communication protocol;
receive a second association request of the multimode device through the second physical interface, the second association request comprising a MAC address of a fourth physical interface, the fourth physical interface is a physical interface of the multimode device, and a protocol type used by the fourth physical interface is the second communication protocol;
obtain an Internet Protocol version 6 (IPv6) address of the multimode device; and
record a first correspondence and a second correspondence, the first correspondence comprising a correspondence among the IPv6 address of the multimode device, the MAC address of the third physical interface, and the first physical interface, and the second correspondence comprises a correspondence among the IPv6 address of the multimode device, the MAC address of the fourth physical interface, and the second physical interface.

16. The gateway device according to claim 15, wherein the gateway device is further configured to:
receive a first packet with a destination IP address comprising the IPv6 address of the multimode device; and
set a destination MAC address of the first packet to the MAC address of the third physical interface based on the first correspondence, to obtain a second packet, and send the second packet through the first physical interface; or set a destination MAC address of the first packet to the MAC address of the fourth physical interface, based on the second correspondence, to obtain a third packet, and send the third packet through the second physical interface.

17. The gateway device according to claim 15, wherein the gateway device is further configured to send a first notification to the multimode device through the first physical interface, wherein the first notification comprises a MAC address of the first physical interface.

18. The gateway device according to claim 17, wherein the gateway device is further configured to receive a fourth packet through the first physical interface, wherein a destination MAC address of the fourth packet is the MAC address of the first physical interface, a source MAC address of the fourth packet is the MAC address of the third physical interface, and a destination IP address of the fourth packet is a source IP address of the first packet.

19. The gateway device according to claim 15, wherein the gateway device is configured to send a second notification to the multimode device through the second physical interface, wherein the second notification comprises a MAC address of the second physical interface.

20. The gateway device according to claim 19, wherein the gateway device is further configured to receive a fifth packet through the second physical interface, wherein a destination MAC address of the fifth packet is the MAC address of the second physical interface, a source MAC address of the fifth packet is the MAC address of the fourth physical interface, and a destination IP address of the fifth packet is the source IP address of the first packet.

* * * * *